(12) United States Patent
Wilson et al.

(10) Patent No.: US 6,607,794 B1
(45) Date of Patent: Aug. 19, 2003

(54) LIGHT-REFLECTING MOLDED ARTICLES AND METHODS OF MAKING THE SAME

(75) Inventors: John Colvin Wilson, Wayne, NJ (US); Lawrence Wayne Shacklette, Maplewood, NJ (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/238,827

(22) Filed: Jan. 28, 1999

Related U.S. Application Data

(63) Continuation-in-part of application No. 09/110,040, filed on Jul. 2, 1998, now Pat. No. 6,224,237, which is a continuation-in-part of application No. 09/061,562, filed on Apr. 16, 1998, now Pat. No. 6,186,649.

(51) Int. Cl.[7] .................................................. F21V 7/00
(52) U.S. Cl. .................... 428/34.1; 428/34.5; 428/36.4; 362/84
(58) Field of Search ............................... 428/34.1, 34.5, 428/36.9, 36.92, 36.4; 362/298, 301, 302, 84; 355/67; 358/475

(56) References Cited

U.S. PATENT DOCUMENTS

| | | | |
|---|---|---|---|
| 4,132,563 A | 1/1979 | Burke, Jr., deceased et al. | 106/308 |
| 4,707,510 A | 11/1987 | Imai et al. ................... | 524/281 |
| 5,079,678 A | * 1/1992 | Parker ......................... | 362/84 |
| 5,103,385 A | 4/1992 | Federico et al. ............ | 362/298 |
| 5,241,459 A | 8/1993 | Kaplan et al. ............... | 362/298 |
| 5,248,556 A | 9/1993 | Matijevic et al. ........... | 428/403 |
| 5,376,721 A | 12/1994 | McGarry et al. ............. | 525/64 |
| 5,395,874 A | * 3/1995 | Mishima et al. ............. | 524/409 |
| 5,428,105 A | 6/1995 | McGarry et al. ............. | 525/69 |
| 5,453,849 A | 9/1995 | Copenhaver et al. ........ | 358/475 |
| 5,565,958 A | 10/1996 | Kaplan ........................ | 355/67 |
| 5,589,524 A | 12/1996 | Ogita et al. ................. | 523/212 |
| 5,672,409 A | 9/1997 | Miyakawa et al. ......... | 428/141 |
| 5,837,757 A | 11/1998 | Nodera et al. ............... | 524/87 |

FOREIGN PATENT DOCUMENTS

| | | |
|---|---|---|
| EP | 2 255 551 A | 7/1975 |
| EP | 1 533 870 A | 11/1978 |
| EP | 2 020 000 A | 11/1979 |
| EP | 0717079 A | 6/1996 |

OTHER PUBLICATIONS

Database WPI, Derwent Publications Ltd., London, GB: AN 1993–371339[47] XP002139399 and JP 05 271515 A (Asahi Chem Ind Co Ltd), Oct. 19, 1993 abstract.

(List continued on next page.)

*Primary Examiner*—Harold Pyon
*Assistant Examiner*—Sow-Fun Hon
(74) *Attorney, Agent, or Firm*—Roberts & Mercanti, LLP

(57) ABSTRACT

A light-reflecting article having an average total reflectivity of at least about 93%, e.g., at least about 95%, for light in a 400 to 700 nanometer wavelength range comprises a thermoplastic or thermoset polymer matrix, such as an acrylonitrile-butadiene-styrene-based matrix, in which is dispersed reflective filler particles such as rutile titania and a flame-retardant material. The flame-retardant material may contain a particulate metal oxide synergist, e.g., antimony trioxide or antimony pentoxide, and a quencher such as a brominated organic compound, e.g., bis(tribromophenoxy) ethane. The polymer matrix and filler may be selected so that their respective refractive indices and the size range of the filler particles satisfies a mathematical relationship having as a function thereof the mean freespace (vacuum) wavelength of the light range being reflected. The article may comprise a light-reflecting enclosure (14) of an illumination source (10), the enclosure (14) having at least one linear aperture (16) formed therein and enclosing a linear light source (12).

48 Claims, 4 Drawing Sheets

OTHER PUBLICATIONS

Database WPI, Derwent Publications Ltd., Longdon, GB: AN 1984–065113[11] XP002139400 & JP 59 020347 A (Shin Kobe Electric Machinery), Feb. 2, 1984 abstract.

Database WPI, Derwent Publications, Ltd., London, GB: AN 1995–355353 [46] XP002139401 & JP 07 242781 A (Mitsubishi Gas Chem Co Inc), Sep. 19, 1995 abstract.

PCT Search Report.

English Abstract 2 255 551 A.

Technical brochure "Ti–Pure® Titanium Dioxide.", 1997 copyright notice of E.I. DuPont de Nemours and Company.

* cited by examiner

LIGHT-REFLECTING MOLDED ARTICLES AND METHODS OF MAKING THE SAME

CROSS-REFERENCE TO RELATED APPLICATIONS

This application is a continuation-in-part of U.S. patent application Ser. No. 09/110,040, filed Jul. 2, 1998 entitled STRUCTURE FOR ACHIEVING A LINEAR LIGHT SOURCE GEOMETRY, now U.S. Pat. No. 6,224,237, which is itself a continuation-in-part of U.S. patent application Ser. No. 09/061,562, filed Apr. 16, 1998, and entitled LINEAR ILLUMINATION SOURCES AND SYSTEMS, now U.S. Pat. No. 6,186,649.

BACKGROUND OF THE INVENTION

1. Field of the Invention

This invention relates to light-reflecting molded or extruded articles having a reflectivity high enough to enhance the efficiency of illumination sources, and to methods of making the same. More specifically, the present invention relates to light-reflecting articles made of synthetic organic polymers ("plastics") whose structural strength, dimensional stability and other properties make them suitable for use as light-reflecting articles such as light-reflecting enclosures for use in conjunction with light sources. The plastic articles of the invention have a total reflectivity of at least about 93 percent, preferably at least about 94 percent, more preferably at least about 95 percent and most preferably at least about 96 percent, which is attained without the necessity of using reflective films or metal coatings.

2. Related Art

U.S. Pat. No. 5,589,524 to Y. Ogita et al, issued Dec. 31, 1996, provides a polyphenylene sulfide resin composition said to be useful for making a light-reflective molded article comprising from 40 to 60 percent by weight of a polyphenylene sulfide resin containing from 30 to 50 percent by weight calcium carbonate having an average particle size of from 1 to 7 microns, and from 8 to 25 percent by weight of mica having an average particle size of from 1 to 10 microns. (See the Abstract.) The use of other fillers in the composition is disclosed at column 4, lines 38–48, "so long as the effect of the present invention is not impaired." A list of such other fillers includes antimony trioxide, zinc oxide, and titanium oxides, among numerous other examples.

U.S. Pat. No. 4,132,563 to Burke, Jr. et al, issued Jan. 2, 1979, discloses an intraleucospheruloid/organic color pigment composition and a process for producing the same. As set forth in the Abstract of the disclosure, the intraleucospheruloid/organic color pigment composition consists essentially of spheruloids of essentially transparent polymer material having primary particles of an average size not exceeding 4 microns in diameter, and which have embedded therein a particulate leuco pigment composition. The latter consists essentially of inorganic opaque white and/or transparent white pigment material having a different refractive index from that of the polymer, and primary particles of an average size not exceeding 0.2 microns in diameter, plus an organic pigment material. The organic pigment material is said to consist of organic color pigment compositions having primary particles of an average size of less than 0.2 microns in diameter. As disclosed starting at column 1, line 38 of this Patent, the pigment compositions of the invention are said to have a very high degree of light stability regardless of the use to which they are put, and can also provide improved physical characteristics such as storage stability, ease of handling and incorporation into vehicles such as paints and thermoplastic materials.

U.S. Pat. No. 5,672,409 to K. Miyakawa et al, issued Sep. 30, 1997 and, as shown in the Abstract, discloses a white polyester film reflector used in a surface light source. The white polyester film has fine voids formed therein and its apparent specific gravity is in the range of 0.5 to 1.2. The reflectance of the polyester film is said to be increased by the presence of the fine voids. One disclosed use for the reflector is in a surface light source having a side light system to provide, for example, a bright scope of a liquid crystal display.

U.S. Pat. No. 5,428,105 to F. J. McGarry, issued Jun. 27, 1995 and is based on a division of the application which matured into U.S. Pat. No. 5,376,721 on Dec. 27, 1994. This patent discloses a curable polyester molding composition incorporating an elastomeric low-profile additive dispersed in voided rubbery particle form throughout the composition. A compatibilizing agent is used in association with the additive to form a molded thermoset article having very smooth light-reflective class A surfaces and other qualities as enumerated, for example, in the Abstract.

A technical brochure bearing a 1997 copyright notice of E.I. Du Pont de Nemours and Company is entitled "Ti-Puret Titanium Dioxide". This brochure describes optical and other properties of titanium dioxide and discusses the effect of particle size of the titania on the color tint of transmitted light. For example, at page 1 of the brochure, it is stated that the transmitted appearance of tints or whites which contain small particle size titania grades are yellower than similar products containing a larger particle size titania. In Appendix C of the brochure, there is a discussion of the effect of particle size of the titania additive on the appearance and performance of the products in which it is used. Table I gives indices of refraction for some white pigments, including rutile and anatase titania, and some common plastics.

SUMMARY OF THE INVENTION

In accordance with the present invention, there is provided a light-reflecting article which comprises a thermoplastic or thermoset polymer matrix having dispersed therein a flame-retardant material and dispersed particles of a reflective filler. The reflective filler, e.g., one or more of rutile or anatase titania, zinc sulfide or strontium titanate, comprises a dielectric material having a particle size and reflective properties which enhance total reflectivity of the composite. The filler further has an index of refraction which differs from the effective index of refraction of the other components of the composite to a degree sufficient to enhance the total reflectivity of the composite. The filler and flame-retardant material are sufficiently dispersed and present in amounts such that the article has an average total reflectivity as measured from a flat sample of at least about 93 percent, preferably at least 94 percent, more preferably, at least 95 percent, over the range of visible light.

In one aspect of the present invention, the article has a flame retardance equivalent to a LT-94 rating (defined below) of at least V-1, i.e., of V-1 or V-0. In another aspect, the flame-retardant material comprises (i) particles of a metal oxide synergist, e.g., one or more of antimony trioxide, antimony pentoxide and sodium antimonate, and (ii) a halogenated organic compound quencher, e.g., a brominated organic compound such as bis( tribromo-phenoxy) ethane or an organic phosphate or borate. The flame-retardant material is present in an amount sufficient to reduce flammability of the article relative to an otherwise identical article lacking the flame-retardant material, e.g., the flammability is reduced to a level equivalent to a UL-94 rating of V-1 or V-0. Further, the filler and the flame-retardant material are present in amounts such that the article has a reflectivity of at least about 93 percent for light in a wavelength range of from about 400 to 700 nanometers, measured as total reflectivity (specular plus diffuse) from a flat sample.

A further aspect of the present invention provides that the particles of filler have a size range wherein: when the filler comprises titania, at least about 70 percent by weight of the titania particles have a diameter of from about 0.12 to 0.44 microns; when the filler comprises zinc sulfide, at least about 70 percent by weight of the zinc sulfide particles have a diameter of from about 0.17 to 0.65 microns; and when the filler comprises strontium titanate, at least about 70 percent by weight of the strontium titanate particles have a diameter of from about 0.16 to 0.62 microns.

Another aspect of the present invention provides for the inclusion of a brightener selected from the group consisting of fluorescent materials which absorb radiant energy in the ultraviolet region of the electromagnetic spectrum (wavelengths 300 nanometers to 400 nanometers) and emit this energy as visible light in the blue region of the spectrum (wavelengths from 400 nanometers to 470 nanometers). Examples of such materials include Eastobrite® OB-1 and OB-3 produced by Eastman Chemical Corp. of Kingsport, Tenn., Uvitexo-®-OB, and Uvitex®-MD produced by Ciba Specialty Chemicals of Basel, Switzerland, and Leucopure® EGM, Hostalux KCB, and Hostalux KSB from Clariant of Muttenz, Switzerland.

The present invention also provides that the article as aforesaid may comprise a light-reflecting enclosure, the enclosure having at least one aperture formed therein and being dimensioned and configured to receive therein a light source disposed within the enclosure to transmit light through the aperture.

In accordance with the present invention the polymer matrix may be any substantially clear or white thermoplastic or thermosetting polymer, such as those chosen from the group consisting of polyacrylonitrile, polyesters, epoxies, polyurethanes, acrylonitrile-butadiene-styrene terpolymer, poly(methylpentene), polypropylene, polystyrene, polycarbonate, polymethacrylate, polyacrylate, poly(vinyl chloride), chlorinated polyethylene, and substituted derivatives, copolymers, blends and alloys of any of the foregoing. In a related preferred aspect of the invention, the polymer matrix comprises a blend of the acrylonitrile-butadiene-styrene copolymer with polyvinyl chloride polymer, or a blend of the acrylonitrile-butadiene-styrene terpolymer with a polycarbonate polymer. For example, the polymer matrix may comprise from about 10 to 50 weight percent of the acrylonitrile-butadiene-styrene terpolymer and from about 40 to 90 weight percent of the polycarbonate polymer.

In accordance with another major aspect of the present invention, there is provided a light-reflecting article comprising a thermoplastic or thermosetting polymer matrix having a refractive index of $n_1$, the polymer having dispersed therein particles of a reflective filler having a refractive index of $n_2$. The particles of filler have a size range wherein at least about 60 percent by weight, e.g., at least about 70 percent by weight, of the particles have a diameter of from about D to 4D, wherein $D=\lambda \delta_o/\pi n_1 \delta$, in which $\lambda_o$ is the mean free-space wavelength of the light range being reflected and $\delta=|n_2-n_1|$. The filler is present in an amount such that the article has a reflectivity of at least about 93 percent, e.g., at least about 94 percent, or at least about 95 percent, for light in a wavelength range of from about 400 to 700 nanometers, measured as total reflectivity from a flat sample.

Other aspects of the present invention are set forth in the following description and the appended drawings.

DETAILED DESCRIPTION OF THE INVENTION AND PREFERRED EMBODIMENTS THEREOF

Figure 1:
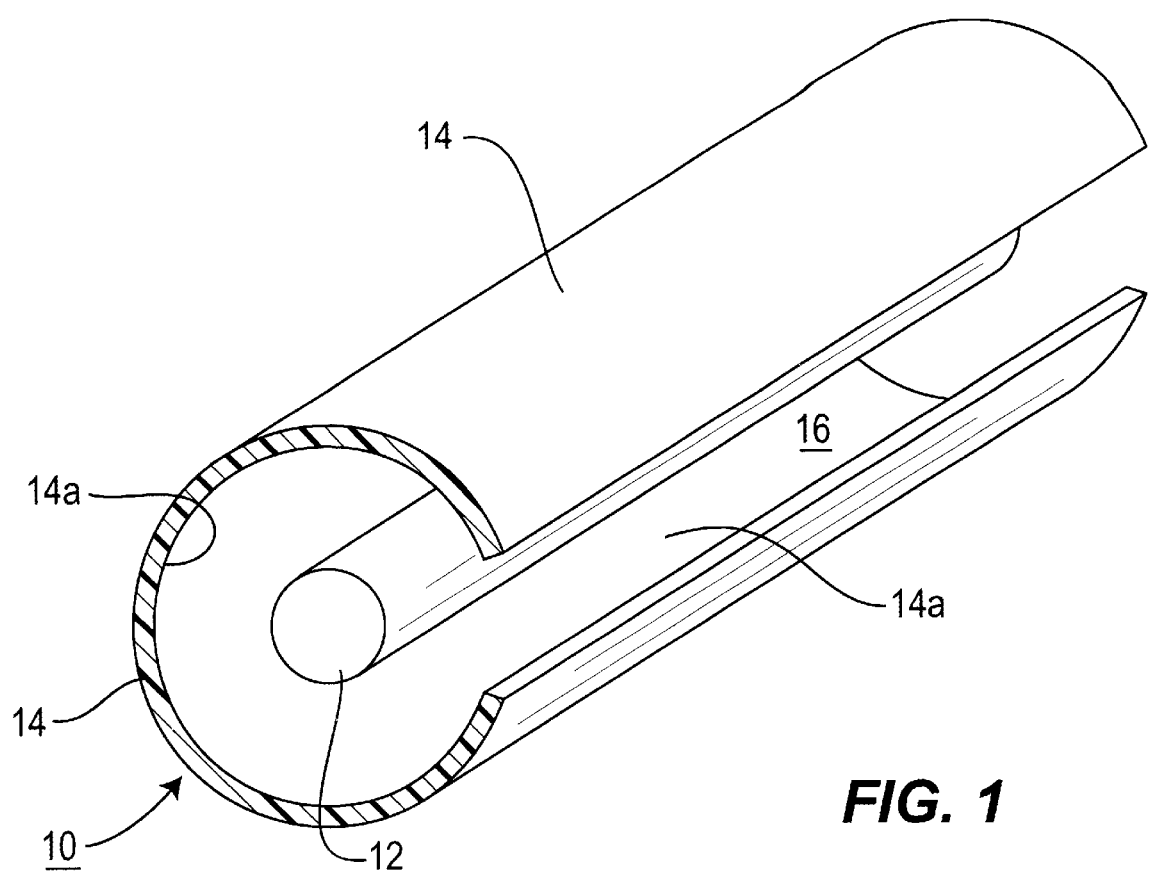
FIG. 1 is a schematic perspective view of a linear illumination source comprised of a linear light source and a light-reflecting enclosure in accordance with one embodiment of the present invention.

The articles of the present invention find use wherever a plastic composition having high reflectivity for light is required. In particular, the articles of the present invention find use as light-reflecting enclosures of the type having a slit or other aperture formed therein, through which light from a light source, such as a linear light source contained within the enclosure, is emitted. The emitted light comprises both reflected light, which is reflected from the interior surface of the light-reflecting enclosure, and some unreflected light emitted from the light source directly through the aperture. Such devices find many uses, for example, as an illumination source in photocopiers and optical scanners. In such applications, which often use a narrow, slot-like aperture, efficiency is often adversely affected because much of the light emitted from the enclosed light source must be reflected numerous times before emerging from the aperture. In applications such as photocopiers and optical scanners, high output irradiance is desired in order to illuminate a narrow strip of the area being scanned or photocopied. In other applications, such as flat panel displays, an illumination system having a very shallow thickness is highly desirable, and a significant reduction in depth can be achieved by providing a highly efficient linear illumination source with high output irradiance, which can be efficiently coupled to a thin planar waveguide. (Irradiance is the light flux per unit area and may be expressed, for example, in units of watts per square centimeter. Radiance is the brightness of the light and may be expressed, for example, in units of watts per square centimeter per steradian, wherein a steradian is the unit of a solid angle.) Because, as discussed below, the reflectivity of such light-reflecting enclosures has a pronounced effect on the efficiency of the illumination system, it is highly desirable that the plastic composition have a total reflectivity for light in the wavelength range of 400 to 700 nanometers of at least 93 percent, preferably at least 94 percent, still more preferably at least about 95 percent and most preferably at least about 96 percent, measured as total reflectivity from a flat (planar) sample.

The highly reflective plastic articles of the present invention are often used in environments where they must be fashioned to close tolerances and where dimensional stability is very important. It is therefore highly desirable that, for such uses, the articles be capable of being extruded or molded to close dimensional tolerances and that they maintain such tolerances even when subjected to mechanical stress, high temperatures and humidities, as well as wide variations in temperature and humidity. Further, because such articles are often used in extremely close proximity to high-voltage, high-intensity light sources, the articles must be fireproof and creep-resistant under the pressure of screws and other mechanical fasteners, even at high temperatures. The plastic articles should in many cases also have ultraviolet stability because, in many uses, they are exposed to the ultraviolet output of various light sources for extended periods.

Because the filler which is necessary to impart the desired high-reflectivity to the plastic article is often used in significant quantities, it has a tendency to degrade processability and toughness of the plastic composition from which the light-reflecting article of the invention is extruded or molded. Therefore, it is desirable that the polymer matrix be a polymer which is easily processed, i.e., has a relatively high melt index, but still retains good melt elasticity and which has a desirably high impact resistance and elongation-to-break. High heat deflection temperature, high flexural modulus and high strength of the polymer matrix will help to insure that the light-reflecting plastic articles of the invention retain their shape and do not yield under flexural and torsional stress. These desirable properties are attainable, in accordance with the practices of the present invention, without unduly adversely affecting the reflectivity of the articles. It is a feature of the present invention that the required degree of total reflectivity be obtained from the molded or extruded plastic composition itself, without the necessity of coating the plastic article with reflective films or other metalized coatings. Finally, the plastic compositions from which the light-reflective articles are made desirably should be capable of being extruded or molded by conventional techniques.

The articles of the present invention meet such criteria.

Figure 1A:
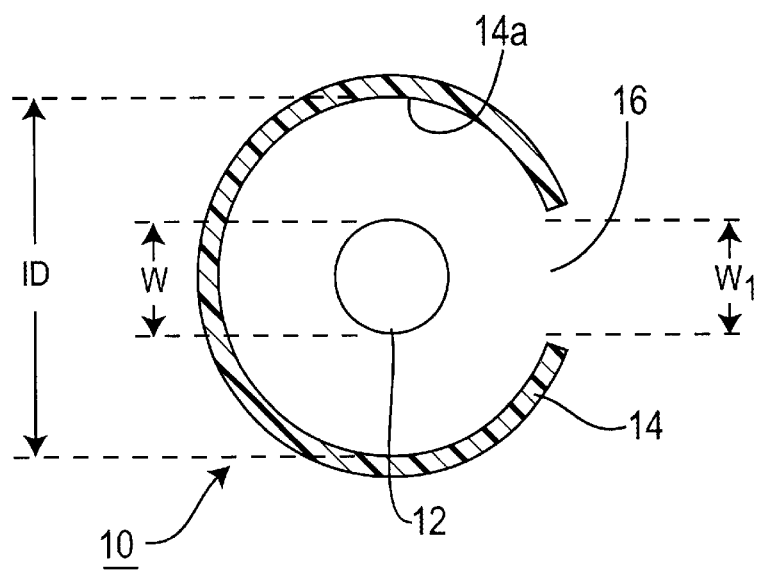
FIG. 1A is a schematic cross-sectional view of the illumination source of FIG. 1 taken perpendicularly to the longitudinal axis thereof.

To illustrate only one type of article in accordance with the present invention, there is shown in FIGS. 1 and 1A a linear illumination source 10 comprising a linear light source 12 having a width W and enclosed by a light-reflecting enclosure 14 in accordance with one embodiment of the present invention. Light-reflecting enclosure 14 has an inside diameter ID and a linear, slot-like aperture 16 formed therein and extending along the length thereof, generally parallel to the longitudinal axis (not shown) of light-reflecting enclosure 14. Linear aperture 16 has a width w, and light-reflecting enclosure 14 has in interior surface 14a. It will be appreciated that the light-reflecting enclosure 14 may have any cross-sectional shape; in addition to the circular cross-sectional shape illustrated in FIGS. 1 and 1A, the cross-sectional shape may be, but is not limited to, elliptical oval, cusp-shaped, or polygonal (faceted).

Figure 2:
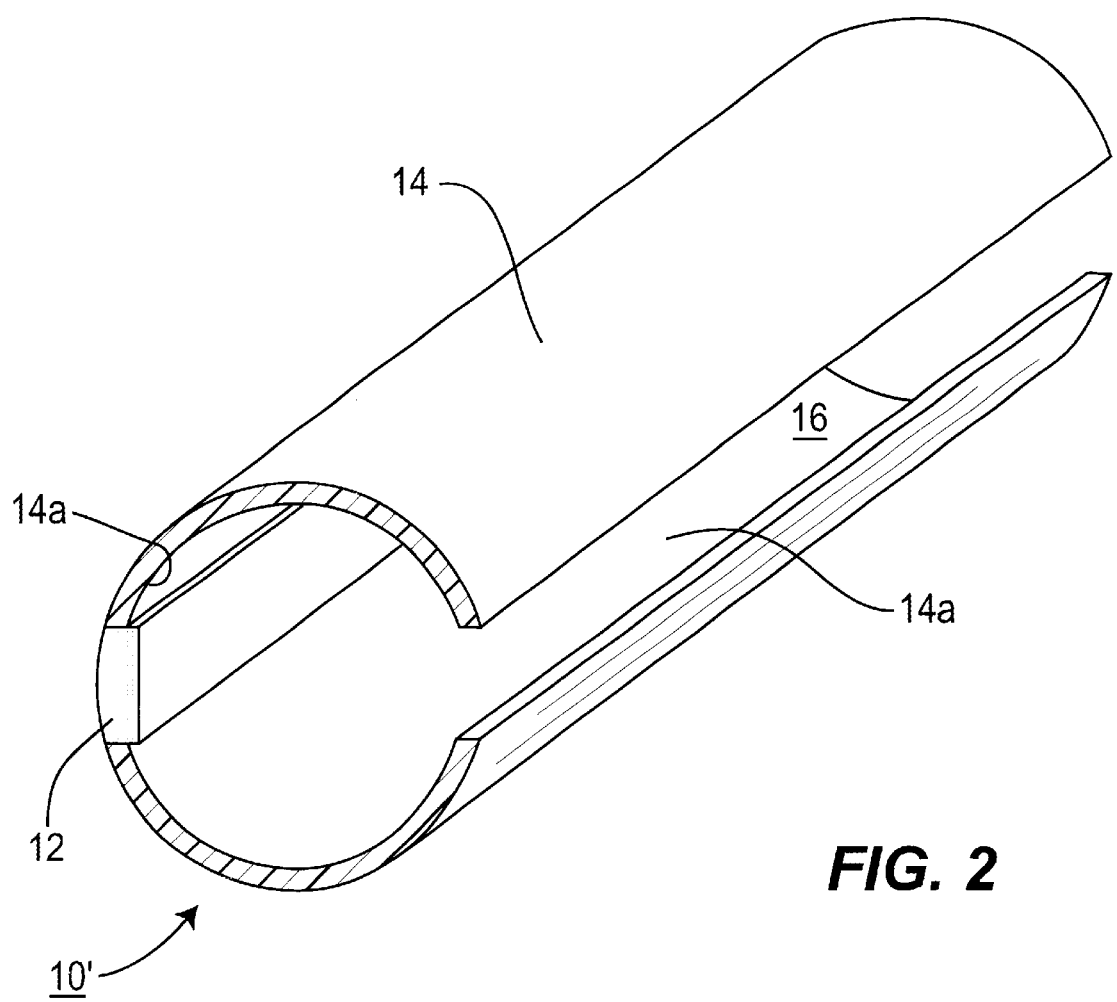
FIG. 2 is a schematic perspective view of a linear illumination source comprised of a linear light source and a light-reflecting enclosure in accordance with a second embodiment of the present invention.
Figure 2A:
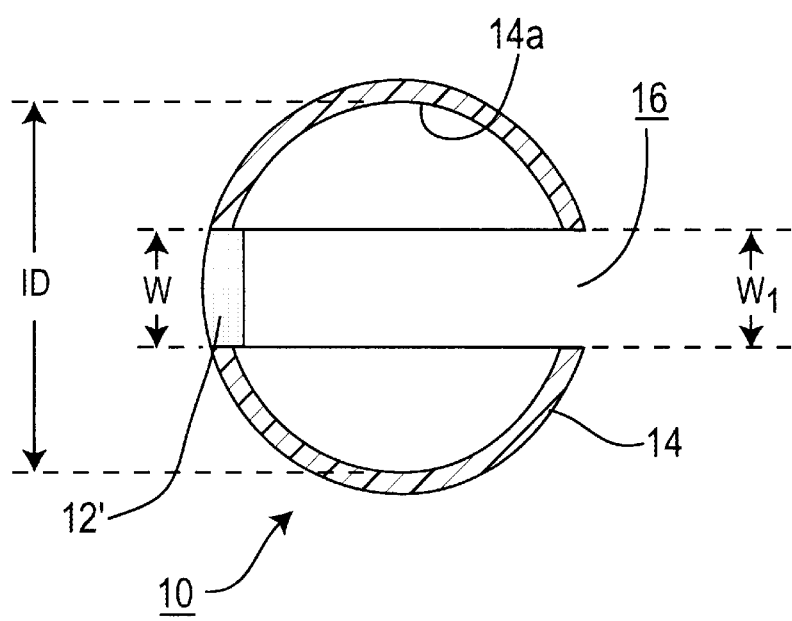
FIG. 2A is a schematic cross-sectional view of the illumination source of FIG. 2 taken perpendicularly to the longitudinal axis thereof.

The same applies to the embodiment illustrated in FIGS. 2 and 2A, which illustrates a linear illumination source 10' which is identical to the embodiment of FIGS. 1 and 1A, except as follows. In lieu of light source 12 supported (by conventional means not shown in FIGS. 1 and 1A) along the longitudinal axis of the light-reflecting enclosure 14, a linear light source 12' is embedded in and thereby supported by light-reflecting enclosure 14 and projects from the interior surface 14a thereof. All the other components of the linear illumination source 10' of FIGS. 2 and 2A are identical to those of linear illumination source 10 illustrated in FIGS. 1 and 1A and are identically numbered thereto. Accordingly, the description thereof is not repeated.

Linear illumination sources 10 and 10' form part of the disclosure of copending and commonly assigned U.S. patent application Ser. No. 09/061,562, filed Apr. 16, 1998 which describes an improvement in such devices over the use of fluorescent lamps having an internal slot aperture utilized to concentrate and direct the omitted light into a narrow angular range. It will be appreciated that the linear light sources 12 and 12' may comprise, without limitation, one or more of fluorescent lamps, light-emitting diodes, laser diodes, organic light-emitting diodes, electroluminescent strips and high-intensity discharge lamps. Such linear light source need not be an integral structure, but one may be constructed, for example, from a multiplicity of light-emitting diodes arranged in a linear array. As used herein and in the claims, the term "light" is used broadly to encompass various light spectra including visible light, ultraviolet light, and selected broad and narrow wavelength ranges, e.g., 400 to 700 nanometers.

It will be appreciated that the energy efficiency of a light source such as linear illumination sources 10 and 10' is greatly affected by the reflectivity of the light-reflecting enclosure 14 inasmuch as much or most of the light emitted from linear light source 12 or 12' must undergo a large number of reflections before emerging from the linear aperture 16. For example, the efficiency of illumination of linear illumination source 10 of FIGS. 1 and 1A can be defined as the percentage of the light emitted from linear light source 12 which escapes through linear aperture 16. If the width w, of linear aperture 16 comprises one-tenth of the circumference of light-reflecting enclosure 14, only 10 percent of the light emitted from linear light source 12 will escape directly through linear aperture 16, that is, without first having been reflected from interior surface 14a. The remaining 90 percent of the light output of linear light source 10 will be reflected one or more times, e.g., ten times or more, before escaping through linear aperture 16. The large number of reflections makes it very important that the reflectivity of interior surface 14a be as close to 100 percent as possible. The profound effect which the reflectivity of interior surface 14a has on the efficiency of a linear illumination source 10 is well illustrated by a series of tests comparing reflectivity of the interior surface of a linear illumination source to efficiency of the source. The tests were conducted with a linear illumination source of the same general type of construction as illustrated in FIGS. 1 and 1A, the component numbering of which is applied in parentheses to the component of the test source in the following description. The linear illumination source (10) comprised a cold-cathode fluorescent lamp (12) which was 2.6 mm in diameter (W) and 268 mm in length and was enclosed within an acrylic light-reflecting enclosure (14) having an inside diameter (ID) of 6.4 mm and a fixed-width linear aperture (16) which was 1.5 mm wide ($w_1$). The lamp (12) was driven by an inverter of approximately 3.7 watts input power. Five different reflective material films (not in accordance with the present invention) were placed sequentially inside the enclosure (14). The film materials were: polyethersulfone filter material (obtained from Pall Gelman Sciences of Port Washington, N.Y.), Spectraflect™ (obtained from Labsphere of North Sulton, N.H.), Duraflect™ (obtained from Labsphere), Silverlux™ (obtained from 3M of Minneapolis, Minn.), and Predator™ (obtained from Pall Gelman Sciences). All the reflecting materials with the exception of the Silverlux™ film were diffuse reflectors. Table A below shows the measured illumination source efficiencies (output lumens per watt of input energy) as a function of the measured total reflectivity (specular plus diffuse) of the film material.

TABLE A

| Reflecting Material | Reflectivity | Efficiency |
|---|---|---|
| Polyethersulfone | 97.7% | 54.3% |
| Spectraflect ™ | 97.5% | 54.3% |
| Duraflect ™ | 96% | 48% |
| Silverlux ™ | 92% | 41.9% |
| Predator ™ | 85% | 31.3% |

Figure 3:
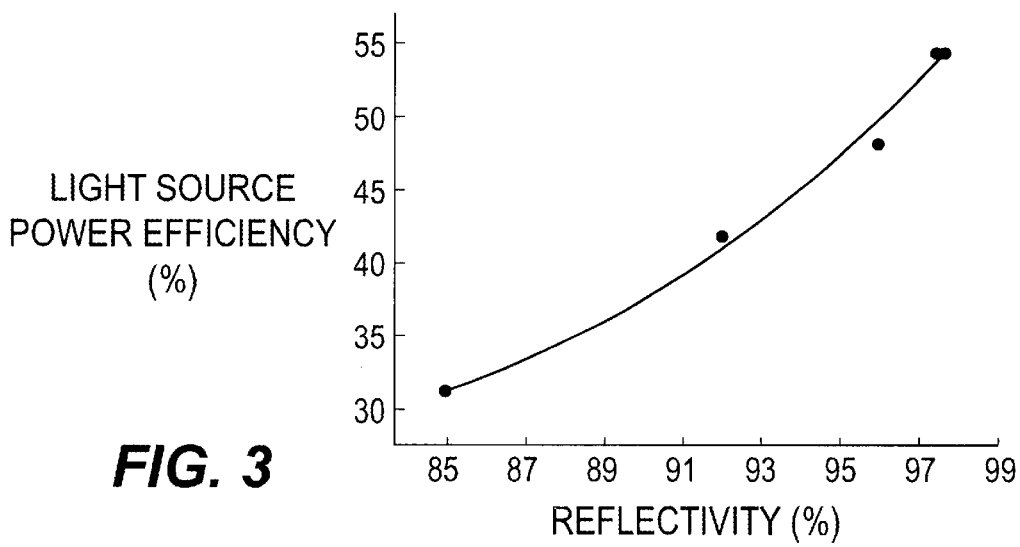
FIG. 3 is a plot of light source power efficiency compared to reflectivity of the inner surface of an illumination source.

It is seen from Table A that small changes in the reflectivity of the interior surface (corresponding to interior surface 14a of FIGS. 1 and 1A) can result in large changes in the efficiency of the linear illumination source. FIG. 3 plots the data of Table A, the power efficiency of the illumination source being plotted on the vertical axis against reflectivity of the tested films on the horizontal axis. FIG. 3 illustrates that the enhancement of efficiency is still increasing rapidly even at reflectivities as high as 98% and above.

Thus, with respect to, e.g., illumination source 10 of FIGS. 1 and 1A, if the reflectivity of interior surface 14a is 90 percent reflective and light reflects on average ten times from that surface before escaping through linear aperture 16, the overall reflection efficiency is $(0.90)^{10}$ or 35 percent. However, if the reflectivity of interior surface 14a is increased from 90 percent to 95 percent per reflection, and the light reflects 10 times from the surface, the over-all reflection efficiency is $(0.95)^{10}$ or 60 percent. It is seen that increasing the reflectivity of the interior surface 14a from 90 percent to 95 percent increases the efficiency of the output of ten-times reflected light from 35 percent to 60 percent. Further increases in reflectivity above 95 percent of course provide commensurately greater increases in the overall reflective efficiency. It will thus be appreciated that it is extremely important to provide an interior surface 14a of the highest attainable reflectivity. The practices of the present invention attain this objective by the reflectivity of the plastic from which light-reflecting enclosure 14 itself is made, thus avoiding the expense and complications which would result from having to provide a reflective film liner on interior surface 14a. This high reflectivity of the plastic material is attained in accordance with the practices of the present invention while still endowing light-reflecting enclosure 14 with good physical properties. As enumerated above, these physical properties include acceptably high levels of flexural strength, tensile and compressive strength, the ability to be molded or extruded to close tolerances, fire resistance, creep resistance and dimensional stability under high temperature use for protracted periods along with large fluctuations in temperature and humidity. Temperature fluctuations are sustained, for example, between high temperatures encountered in the use of photocopiers, optical scanners and the like, and ambient temperature during non-use periods of such equipment.

As noted above, it has been found that these qualities can be attained without the necessity of providing a reflective film or metallic coating liner on the plastic article, but that a molded or extruded, thermosetting or thermoplastic filled article can be attained which itself has the aforementioned qualities and provides the described high total reflectivity. As used herein and in the claims, the term "total reflectivity" means the sum of specular and diffuse reflection averaged over the range of visible wavelength and weighted for the response of the human eye. The light-reflecting articles can be made from plastic compositions which have acceptable workability, i.e., can be readily molded or extruded by known techniques. It has been found that such plastic articles can be made by dispersing in a matrix of a suitable thermoplastic or thermosetting polymer reflective particles of selected size and optical characteristics relative to the optical characteristics of the polymer.

The Polymer Matrix

While a large number of thermoplastic or thermosetting polymers are usable in connection with the invention, acrylonitrile-butadiene-styrene terpolymers (sometimes herein referred to simply as "ABS"), substituted derivatives thereof and alloys and blends of any of the foregoing have been found to be particularly desirable because such polymers are usually of moderate cost and possess good processability characteristics even when loaded to a significant degree with an inorganic material filler. While many grades of ABS are reflective in their own right due to scattering of light from sizable domains of phase separation, impurities contained in most grades of ABS polymer leave the polymer brownish in color, which results in a decline in reflectivity, at least in certain light wavelength ranges. Accordingly, it is advantageous in some applications to utilize clear, transparent non-yellow matrix polymers and transparent grades of ABS are commercially available. Such transparent ABS grades are normally made either by choosing a rubber fraction (styrene-butadiene or butadiene rubber) which has a domain size significantly less than the wavelength or wavelength range of light to be reflected from the article, and/or which matches the refractive index of the grafted phase to the rubber. Particular grades of such transparent ABS may also contain a fraction based on methyl methacrylate, which helps to achieve a desired matching of the refractive indices of the continuous matrix and the included rubber particles contained in the polymer.

One situation in which the use of a clear, non-yellow ABS is particularly useful occurs when the rutile form of titania is used as the filler. Rutile titania is increasingly opaque at light wavelengths below 420 nanometers. This property is shown by the fact that samples of ABS which contain rutile titania above a minimal 7% level show a tendency for reflected light to fall off rapidly below 420 nanometers. The combined effects of the impurities in ABS and the opacity of rutile titania below 420 nanometers render the light reflected from the article somewhat lacking at the blue end of the visible spectrum. This problem may be addressed through the use of clear, transparent matrix polymers. Generally, it was found that a slightly higher level of titania was required when using transparent ABS as opposed to the yellow to brownish-hued high impact resistance ABS polymers, in order to get equivalent reflectance. For example, 25 percent by weight rutile titania in the transparent ABS gave a similar total reflectance as 18 percent by weight rutile titania in high impact resistance ABS. The requirement for a higher loading stems from the fact that the matrix polymer itself no longer contributes to the scattering of light, thus reducing the number of scattering sites which now must be supplied by the filler alone. Nevertheless, the clear ABS polymer provides advantages of enhanced reflectivity, with the spectral response being controlled by the titania alone, and the reflectivity being much stronger at the blue end of the visible spectrum between 420 and 550 nanometers where the brownish absorption of ordinary ABS polymer had previously degraded reflective performance. To achieve a relatively uniform reflectivity across the visible spectrum it is preferred that the polymer matrix be substantially non-yellow.

Yellowness of transparent plastics may be measured according to the ASTM Standard Test Method for Yellowness of Plastics, ASTM Designation D 1925-70 (Reapproved 1988), which defines a yellowness index ("YI"). This test method is intended primarily for determining the degree of yellowness or change of degree of yellowness under daylight illumination of homogenous, non-fluorescent, nearly colorless transparent, or nearly white translucent or opaque plastics. Normally, the test results are based upon tristimulus values calculated from data obtained on a Hardy-GE-type spectrophotometer, but other apparatus may be used if equivalent results are obtained. The yellowness index ("YI") is the magnitude of yellowness relative to magnesium oxide for CIE Source C. Yellowness index is expressed as follows:

$$YI=[100(1.28X_{CIE}-1.06_{CIE})]/Y_{CIE}$$

wherein:

$X_{CIE}$, $Y_{CIE}$, and $Z_{CIE}$=tristimulus values (Note 1) of the specimen relative to Source C.

Note 1—By this test method, positive (+) yellowness index describes the presence and magnitude of yellowness; a specimen with a negative (−) yellowness index will appear bluish.

Change in yellowness index (ΔYI) is the difference between an initial value, $YI_o$, and YI determined after a prescribed treatment of the plastic.

$$\Delta YI=YI-YI_o$$

Note 2—By this calculation, positive (+)ΔYI indicates increased yellowness and negative (−)ΔYI indicates decreased yellowness or increased blueness.

The test requirements include that opaque specimens shall have at least one plane surface and transparent specimens shall have two surfaces that are essentially plane and parallel, with the measurements being made on the plane surfaces. Specimens which do not have plane surfaces may be compared on a relative basis if they are of the same shape and are similarly positioned for measurement. The reference standards, as set forth in paragraph 6 of the ASTM D 1925 test procedure, call for a primary standard for reflectance measurement to be a layer of freshly prepared magnesium oxide, prepared in accordance with ASTM recommended practice E 259, the disclosure of which is incorporated herein. Paragraph 6.2 provides that instrument standards may be made of magnesium carbonate, barium sulfate or calibrated pieces of white structural glass known an Vitrolite. Test specimens are conditioned at 21 to 25° C., and 45 to 55% relative humidity for not less than forty hours prior to the tests, and the tests conducted in the standard laboratory atmosphere at the same temperature and relative humidity. Yellowness index of transparent and translucent plastics is a function of thickness of the test samples. Therefore, comparisons of different samples should be made only between samples of comparable thickness.

Polymers useful in this invention comprise those with YI values of less than about 10, preferably less than about 5, and most preferably less than about 2.

In the broad practice of this invention, the polymer matrix may be any suitable polymer. The following thermoplastic polymers are particularly useful in the practice of the invention: acrylonitrile-butadiene-styrene (ABS), poly (ethylene terephthalate) (PET), poly(butylene terephthalate) (PBT), poly(methylpentene), polypropylene, polystyrene (PS), polycarbonate (PC), polymethacrylate, polyacrylate, poly(vinyl chloride) (PVC), chlorinated polyethylene (CPE), and substituted derivatives, copolymers, blends and alloys of any of the foregoing. Generally, polyacrylates and poly(methacrylates), and polyolefins such as poly (methylpentene) and polypropylene are less preferred because they are difficult to make flame-retardant. Useful thermosetting polymers include epoxies, urethanes, acrylates, and thermosetting polyesters. A preferred polymer matrix is one which is selected from the group consisting of acrylonitrile-butadiene-styrene terpolymer, substituted derivatives and blends and alloys thereof. A useful filler for this class of polymer matrix comprises titania, especially rutile titania. Examples of useful commercial polymer alloys and blends include a transparent grade of ABS, Terlux® from BASF of Ludwigshafen FRG, ABS/PC blends available in flame-retardant grades, 2500F from RTP Co. of Winona, Minn., Bayblend FR2000 from Bayer of Leverkusen, FRG, or lupilon GP-3L from Mitsubishi Gas Chemical of Tokyo, Japan, flame-retardant ABS/PVC blends such as Cycovin® from Geon of Cleveland, Ohio, or Suprel® from Condea Vista Co. of Houston, Tex., ABS/PC acrylate blends such as Terblend® S KR2864 or KR2865wu from BASF of Ludwigshafen, Germany, or flame-retardant silicone-PC composite such as NuCycle® from Sumitomo Dow Ltd. of Osaka, Japan.

The Filler

As discussed below, it is desirable that the refractive indices of the polymer and the filler used therein be far apart. To achieve a high scattering power, it is preferred that the absolute value of the difference in index of the filler and the matrix be at least about 0.5, more preferably at least about 0.75, and most preferably at least about 1. For example, an ABS polymer with an index of refraction of 1.54 has been found to be very successful when combined with an appropriate quantity of rutile titania filler which has a refractive index of from about 2.6 to 2.9. The rutile titania has an index of refraction which easily satisfies the requirements of the present invention with almost any suitable polymer matrix such as those listed herein which have indices of refraction ranging from about 1.48 to 1.60. While it is possible to employ gas-filled voids (index=1.0) as a filler, such voids are difficult to produce and maintain during the fabrication of the article of this invention. As a result, voids are less preferred as a filler.

It has further been found that particle size and dispersion of the filler affect the attainable light reflectivity, and it is desirable to provide particles of a size above a particular lower limit relative to the mean wavelength of the light to be reflected and to provide an adequate, and preferably, a maximum number of dispersed particles per unit of volume of the filled matrix. Further reduction of the primary particle size of the filler is generally not attainable by mixing once the filler particles are dispersed in the polymer melt. Therefore, the particle size distribution of the filler added to the polymer melt is important. Titania powders are commercially obtainable with submicron primary particle sizes, although the powder may contain a large number of aggregates or agglomerates of individual particles, which aggregates or agglomerates are of course, significantly larger than the primary particle size. In order to obtain a sufficiently high degree of light reflectivity, the particles must be dispersed at a distance from each other which is far apart as compared to the mean wavelength ($\lambda$) of the light to be reflected that is, at least about a distance of $3\lambda$ apart. With respect to enhancing optical scattering efficiency by selecting the particle size and dispersion of the filler, use is made of the theory developed by Mie, as reported in the work *Principles of Optics* by M. Born and E. Wolf, sixth edition, Pergamon, New York 1993, pages 657–664. A simplified version of the Mie equations is useful in selecting the particle size. It is known that when particles become small as compared to the wavelength of light to be reflected, the particles cease to scatter strongly. Mie scattering commences at a given minimum particle size and goes through a series of resonances as particle size increases. With these considerations in mind, a relationship among the refractive indices of the thermoplastic or thermosetting polymer matrix and that of the filler, the filler particle size and the wavelength of light is developed, as follows. For a polymer matrix having a refractive index of $n_1$ and having dispersed therein particles of a reflective filler having a refractive index of $n_2$, the particles of filler should have a size range wherein a stated proportion of the filler particles, e.g., at least about 60 percent by weight, preferably at least about 70 percent, or most preferably at least about 80 percent by weight of the particles have a diameter of from about D to 4D, wherein $D=\lambda_o/\pi n_1 \delta$, in which $\lambda_o$ is the mean free-space wavelength of the light range being reflected (e.g., $\lambda_o$=530 nanometers for green light) and $\delta=|n_2-n_1|$. More preferably the range of particle diameters lies from about 1.5D to about 2.5D. If a bluer tone is desired the particle size range can be shifted toward a slightly lower particle size, e.g., D to 2D.

The filler should be present in an amount such that the article has a reflectivity of at least about 93 percent, e.g., at least about 94 percent and preferably at least about 95 percent, for light in a wavelength range of from about 400 to 700 nanometers. (The reflectivity is measured as total reflectivity from a flat sample.)

It will be noted from the above that the larger the absolute difference between the indices of refraction of the matrix polymer and the filler, the smaller is the most useful particle size for a given wavelength of light. For example, in the case where rutile titania (index of refraction equals 2.7) is used as the filler for a transparent ABS having an index of refraction of 1.54, the values for the minimal and optimal filler particle size may be predicted as listed in the following Table A. The data of Table A illustrate that, when a high reflectivity for a range of wavelengths is desired, particle size must be distributed over a range which encompasses the resonant scattering condition for light at the limits of the desired wavelength range. For example, to efficiently reflect blue, green and red light. The particle size for rutile titania should be distributed over a range from at least about 160 nanometers to at least about 239 nanometers.

TABLE B

Optimal Particle Size For Rutile Titania As A Filler

| Wavelength (nm) | Min. Particle Size, D (nm) | Particle Size for First Resonance, 2D (nm) |
|---|---|---|
| 450 (blue) | 80 | 160 |
| 530 (green) | 94 | 189 |
| 670 (red) | 119 | 239 |

The optimal particle size range shifts as the index of refraction of the filler changes. If alumina particles (index of refraction equals 1.77) were to be used as the filler, the minimum and optimal particle sizes given in the above Table A for rutile titania would be approximately quintupled. Fillers suitable for use in the practices of the invention are given in the following Table C.

TABLE C

Fillers

| Material | Index of Refraction | Density | Major Use |
|---|---|---|---|
| $TiO_2$, rutile | 2.616, 2.903 | 4.26 | white pigment |
| $TiO_2$, anatase | 2.554, 2.493 | 3.84 | white pigment |
| $Al_2O_3$, alumina | 1.77 | 3.97 | various |
| $Sb_2O_3$, valentinite | 2.18, 2.35, 2.35 | 5.67 | FR, pigment |
| $SrTiO_3$ | 2.409 | 5.18 | |
| $BaSO_4$, barite | 1.637, 1.638, 1.649 | 4.5 | white pigment |
| $CaSO_4$, anhydrite | 1.569 | 2.96 | filler, white pigment |
| $CaCO_3$, aragonite | 1.530, 1.681, 1.685 | 2.93 | filler |
| $CaCO_3$, calcite | 1.658, 1.486 | 2.71 | filler |
| ZnO, zincite | 2.008, 2.029 | 5.6 | white pigment |
| ZnS, wurzite | 2.356, 2.378 | 3.98 | white pigment |
| ZnS, spheralite | 2.368 | 4.10 | white pigment |

Particularly useful fillers are those selected from the group consisting of titania, zinc sulfide and strontium titanate since these offer a high scattering power by virtue of their high refractive indices when compared to those of useful matrix polymers. In such case, the particles of filler preferably have a size range wherein: when the filler comprises titania, e.g., rutile titania, at least about 60 percent by weight of the titania particles have a diameter of from about 0.12 to 0.44 microns; when the filler comprises zinc sulfide, at least about 60 percent by weight of the zinc sulfide 10 particles have a diameter of from about 0.17 to 0.65 microns; and when the filler comprises strontium titanate, at least about 60 percent by weight of the strontium titanate particles have a diameter of from about 0.16 to 0.62 microns.

As discussed above, in cases where the refractive indices of the filler and the matrix polymer approach each other, the fillers will not be efficient scatterers of light and, therefore, total reflectivity will be reduced.

Dispersability of the filler in the polymer matrix is important. For heavy loadings of filler it may be necessary or desirable to make a master batch or concentrate of the polymer melt containing a very high loading of filler. For example, the concentrate may contain filler in the range of 50 to 60 weight percent of the combined weight of filler and polymer. High loading of filler in the concentrate increases the viscosity of the melt and results in a large amount of dispersive energy being imparted to the melt during high shear mixing.

Dispersing aids which enhance the dispersion of the filler particles into the polymer matrix are also desirably used.

Generally, these take the form of compatibilizers, or wetting agents. Silanes and organic titanates or zirconates are known for use as coupling agents to enhance the surface interaction between the filler and the matrix polymer melt. The use of titanates with titania is a felicitous choice. The compatibilizers or wetting agents may be applied to the filler particles prior to or during compounding. For example, titania is commercially available in pre-treated form which has been coated with an organic hydrophobe coupling agent which reduces the surface energy mismatch between the titania particles and the matrix polymer. Wetting agents function in the same fashion. A variety of stearates and related compounds are also known for use as wetting agents. Commercially available forms of titania which have been suitably treated with compatibilizers or wetting agents include TiONA® RCL-4 and TiONA® RCL-188, which are commercially available from Millennium Inorganic Chemicals of Hunt Valley, Maryland or TiPure® R-103 and R-104, which are commercially available from DuPont of Wilmington, Del. The RCL-4 material is surface-treated with alumina and an organic compound as are TiPure® R-103 and R-104, and the RCL-188 material is surface-treated with phosphate and an organic compound. Results obtained by using these commercially available surface-treated titanias in ABS and ABS/PC blends are shown in Table C following. The blue tint tone results from the small average particle size of these particular titania powders which enhances their reflectivity on the blue side of the light spectrum. Alumina coating of the titania particles acts to reduce their reactivity with the matrix polymer either induced by temperature during processing or by exposure to ultraviolet light during subsequent use. Since the most common application for titania in plastics is in PVC for outdoor use, the manufacturers rate UV stability according to whether the PVC/titania composite tends to chalk during extended outdoor use. A thick coating of alumina can prevent chalking by limiting the photoreactivity of the titania. Table C also includes this manufacturer's designation of UV stability for the titania product grades tested. For the present use, depending on the specific requirements for the brightness of the illumination source and the service life of that source, the desire for high reflectivity is balanced with the requirement for UV stability.

TABLE D

Surface-Treated Titania Powder Compounds

| Compound | Dispersability | Tint Strength | Tint Tone | Processing Rheology | UV Stability |
|---|---|---|---|---|---|
| TiONA RCL-4 | Excellent | High | Blue | Excellent | Chalking |
| TiPure R-103 | Very good | High | Bluest | Very good | Non-Chalking |
| TiPure R-104 | Superior | Very high | Bluest | Superior | Chalking |

The polymer matrix may be present in the amount of about 50 to 94 percent by weight of the article and the filler, e.g., rutile titania, may be present in the amount of from about 6 to 50 percent by weight of the article, provided that the amount of one or both of the polymer matrix and rutile titania is controlled to allow for the presence of the flame-retardant material in the amount sufficient to reduce flammability of the article. The amounts of these components are, of course, also controlled to allow for the optional presence of brightener.

Flame-Retardant Package

It is well known that the flame-retardancy of polymers can be enhanced by the inclusion of flame retardants in the composition. Unfortunately, the inclusion of such flame retardants often adversely affects the reflectivity of the filled polymer composite. It has, however, been found that desirable properties of fire-resistance of the plastic light-reflecting articles of the present invention can be attained without unduly sacrificing total reflectivity by combining with the polymer and reflective particles ("filler") a flame-retardant package comprising a quencher and an optional synergist.

The most common types of quencher-type flame retardants are halogenated compounds which act in the vapor phase to quench free radicals, which are an intermediate in combustion reactions. For this reason, such compounds are often referred to as "quenchers". In particular, brominated organic compounds are known to serve as effective flame-retardant quenchers. Useful quenchers are those selected from the group consisting of one or more of decabromodiphenyloxide, octabromodiphenyloxide, tetrabromobisphenol-A, bis(tribromo-phenoxy)ethane, brominated epoxy tetrabromobisphenol-A, tetrabromobisphenol-A diglycidyl ether, ethylenebistetrabromophthalamide, septabromotrimethylphenyl indane and octabromotrimethylphenol indane. The quencher bis(tribromophenoxy)ethane is preferred in some applications. Other common quenchers are based on phosphate and borate compounds and are less preferred for the current invention.

A complete flame-retardant package for inclusion in the composition of a polymer often includes a synergist which functions to carry the halogen, usually chloride or bromide, into the flame by virtue of forming vaporizable oxyhalide compounds. Such metal oxide synergists, which have been found to be particularly useful in the practices of the present invention, are antimony trioxide, antimony pentoxide, and sodium antimonate. Thus, the synergist may be selected from the group consisting of one or more of antimony trioxide, antimony pentoxide and a sodium antimonate, and the quencher may comprise a brominated organic compound. The synergist, for example, antimony trioxide, may have a size range such that at least about 60 percent by weight of the synergist particles, e.g., at least about 70 percent by weight, have a diameter of from about 0.18 to 0.72 microns. Commercially available fine-particle grades of antimony trioxide such as Microfine AO/5 from Anzon, Inc. of Philadelphia, Pa., generally have a wider than optimal particle size distribution. As a result, when used at high loading levels (greater than about 6 percent by weight) the processability and the mechanical properties of the polymer article, e.g., impact resistance and elongation-to-break, are significantly adversely affected. It is therefore advantageous to minimize the use of the synergist. Useful proportions of synergist and quencher provide the synergist in the amount of from about 4 to 12 percent by weight of the article (but preferably less than about 6 percent by weight), and the quencher in the amount of from about 10 to 25 percent by weight of the article. For example, one useful composition for the articles of the present invention comprises from about 31 to about 70 weight percent acrylonitrile-butadiene-styrene, substituted derivatives and blends and alloys thereof as the matrix polymer; from about 15 to about 30 weight percent rutile titania as the filler; and from about 3 to about 5 weight percent of antimony trioxide as the synergist. As the quencher, there may be present from about 12 to 24 weight percent of a brominated organic compound selected from the group consisting of one or more of decabromodiphenyloxide, octabromodiphenyloxide, tetrabromobisphenol A, bis(tribromophenoxy)ethane, brominated epoxy, septabromotrimethylphenyl indane and octabromotrimethylphenyl indane. The amount of one or both of the matrix polymer and the filler are controlled to allow for the presence of the flame-retardant material in the amount sufficient to reduce flammability of the article. A brightener may also be included and the amounts of the other ingredients adjusted to allow for inclusion of such brightener and any other optional additional ingredients.

Since the use of a synergist can adversely affect mechanical properties and reflectivity, it is desirable to employ matrix polymers with inherently lower flammability which do not require a synergist to achieve the required level of flame-retardant. One preferred blend which combines the required ease of processability at high filler loadings and which does not require the use of a synergist is an ABS/PC blend. Such blends can be rendered flame-retardant through the use of halogen- or phosphate-based organic quenchers alone. Among halogen- and phosphate-based quenchers, halogen-based quenchers are preferred.

Flame-retardant properties may also be enhanced by utilization of halogenated organic compounds as part of a polymer matrix blend or alloy, for example, by utilizing chlorinated polyethylene or polyvinyl chloride as the polymer matrix or as a part thereof. For example, both chlorinated polyethylene and polyvinyl chloride readily alloy with ABS polymers, so a suitable matrix may be a blend or alloy of one or both of these halogenated organic compounds with an ABS or ABS-based polymer. If sufficient halogenated organic compound is utilized as part of the polymer matrix blend, sufficient flame retardancy for certain applications may be attained without the need for a package of one or more quenchers and/or synergists.

One embodiment of the invention provides for an acrylonitrile-butadiene-styrene-based polymer as the polymer matrix, titania (preferably rutile titania) as the reflective filler material, and a flame-retardant material comprising particles of a metal oxide synergist and a halogenated organic compound quencher, preferably a brominated organic compound quencher.

Brighteners

Another aspect of the present invention provides for the inclusion of a brightener selected from the group consisting of fluorescent materials which absorb radiant energy in the ultraviolet region of the electromagnetic spectrum (wavelengths 300 nanometers to 400 nanometers) and emit this energy as visible light in the blue region of the spectrum (wavelengths from 400 nanometers to 470 nanometers). Examples of such materials include Eastobrite® OB-1 and OB-3 produced by Eastman Chemical Corp. of Kingsport, Tenn., Uvitex®-OB, Uvitex®-MD produced by Ciba Specialty Chemicals of Basel, Switzerland, and Leucopure® EGM, Hostalux KCB, and Hostalux KSB from Clariant of Muttenz, Switzerland. Useful optical brighteners are generally based on conjugated organic molecules or oligomers. An example of a useful class of compounds are those which contain stilbene segments, or the like, such as 4,4'-Bis(2-benzoxazolyl)stilbene.

When rutile titania is used as the filler, the optical absorbance of the filler at wavelengths below about 420 nanometers can interfere with the action of the brightener. Only that fraction of the brightener which lies relatively near the surface will be exposed to sufficient ultraviolet light to activate the fluorescence of the brightener. Somewhat higher levels of brightener than normally used for low $TiO_2$-loading levels may be required (e.g., 1000 ppm instead of 250 ppm).

It is also preferred that the peak absorption wavelength of the brightener lie relatively near 420 nanometers (e.g., at about 400 nanometers) and the peak emission wavelength lie above 420 nanometers (e.g., at about 450 nanometers).

Various additional optional additives may also be incorporated in the thermoplastic or thermosetting composition depending on the requirements of the polymers chosen and their use environment. Examples of these include antioxidants, photostabilizers, free radical scavengers, and UV absorbers. Antioxidants include such compounds as phenols and particularly hindered phenols including Irganox 1010 from Ciba Specialty Chemicals of Basel, Switzerland, sulfides, organoboron compounds, organophosphorous compounds, N,N'-hexamethylenebis(3,5-di-tert-butyl-4-hydroxyhydrocinnamamide) available from Ciba Specialty Chemicals under the tradename Irganox 1908. A new antioxidant product specifically recommended for use with ABS is Irganox 1141 from Ciba Specialty Chemicals. Photostabilizers and more particularly hindered amine light stabilizers include but are not limited to poly[6-morpholino-s-triazine-2,4-diyl)[2,2,6,6-tetramethyl-4-piperidyl)imino]-hexamethylene] available from Cytec Industries of Kalamazoo, Mich. under the tradename Cyasorb UV3346, and Hostavin N-30 from Clariant of Muttenz, Switzerland. Suitable free radical scavengers include oxygen, hindered amine light stabilizers, hindered phenols, 2,2,6,6-tetramethy-1-piperidinyloxy free radical (TEMPO), and the like. UV absorbers include benzotriazole, hydroxybenzophenone, and the like. These additives may be included in quantities, based upon the total weight of the composition, from about 0% to about 6%, and preferably from about 0.1% to about 1%. Preferably all components of the overall composition are in admixture with one another, and most preferably in a substantially uniform admixture.

The following examples illustrate various compositions illustrative of specific aspects of the present invention and comparisons showing the effect on total reflectivity of specific components of the molding composition from which the articles (test plaques) are made.

Flammability measurements referred to herein, including in the following examples and tables, and in the claims, were performed on molded bars of the described compositions in accordance with the Underwriters Laboratory standard test, UL 94. The test procedures are set forth in "*UL 94 Standard for Test for Flammability of Plastic Materials for Parts in Devices and Appliances*", 4th Ed., Jun. 18, 1991 ("the UL 94 test regime"), published by Underwriters Laboratories, Northbrook, Ill. The disclosure of this publication is incorporated by reference herein.

In the UL 94 test regime, a Horizontal Burning Test (94 HB) is carried out on three sample bars of the material which have been preconditioned by being held at a specified humidity and temperature for a specified time per Part 6 of the UL 94 test regime. The sample is cut to a length of 125 mm and a width of 13 mm and is clamped at one end with its longitudinal axis in a horizontal position and ignited at the other end by a methane gas burner. A classification of 94 HB (horizontal burn) is attained if three samples of 3 to 13 millimeters ("mm") thickness have a maximum burning rate of 40 mm per minute over a 75 mm span. For samples less than 3.0 mm thick, the maximum permitted burning rate for a 94 HB classification is 75 mm per minute over a 75 mm span. Samples which cease to burn before a 100 mm length of sample is burned are also classified 94 HB.

The UL 94 test regime also provides for a Vertical Burning Test which is carried out on five preconditioned (as described above for the Horizontal Burning Test) test bars of 125 mm length and 13 mm width. The maximum thickness is 13 mm and maximum and minimum thickness samples are tested. The samples are clamped in a holding clamp at the upper 6 mm of the specimen which is positioned with its longitudinal axis disposed vertically with its lower end 300 mm above a cotton indicator. The cotton indicator is a horizontal layer of not more than 0.08 gram of absorbent, 100 percent cotton thinned to a 50 by 50 mm square and having a maximum thickness of 6 mm. The methane burner flame is applied to the middle point of the bottom edge of the samples for 10 seconds and then removed and the afterflame duration (flaming which continues after removal of the burner flame) is measured. When afterflaming ceases, a second application of the flame is made for 10 seconds and the afterflame and afterglow time is then measured from the time of removal of the flame. (Afterglow is the persistence of glowing of a material, after cessation of flaming or, if no flaming occurs, after removal of the burner flame.) If afterflame time and afterglow time do not exceed the values given in the first column of Table 8.1 of the UL 94 test regime, and if the sample does not afterflame or afterglow up to the holding clamp, and the cotton indicator is not ignited by flaming particles or drips, a 94V-O classification (self-extinguishing) is attained. Three classifications are attainable by the Vertical Burning Test: 94V-O, 94V-I and 94V-2. The maximum times permitted for a 94V-O classification are a maximum of 10 seconds of afterflame time ("tAF") for any one sample after each of the first and second flame applications, a total of 50 seconds of afterflame time for all five samples("$t_{AF-5}$"), and a maximum of 30 seconds of total afterflame and afterglow time("$t_{AF/AG}$") for any one sample, no afterflame or afterglow of any sample up to the holding clamp at the upper end of the sample, and no ignition of the cotton indicator by flaming particles or drops from the sample. The requirements for a 94V-1 classification are a maximum $t_{AF}$ of 30 seconds, a maximum $t_{AF-5}$ of 250 seconds, a maximum $t_{AF/AG}$ of 60 seconds, no afterflame or afterglow of any sample up to the holding clamp at the upper end of the sample, and no ignition of the cotton indicator by flaming particles or drops from the sample. If all the requirements for a 94V-1 classification are met, except that ignition of the cotton igniter by flaming particles or drops from the sample occurs, a 94V-2 classification is attained.

In the Tables and elsewhere herein and in the claims, "HB"=94 HB, "V-O" 94 V-Q, "V-1"=94V-1 and "V-2"= 94V-2, all pursuant to the UL 94 test regime. A classification of "at least V-1" means a classification of V-1 or V-0. All the Tables below which show flammability ranges show the highest classification (most flame-retardant) attained by the samples, a V-O rating being considered to be the highest possible rating. If no rating ("NR") is indicated, the tested sample failed to attain any UL rating for that particular test, which in practical terms means that flaming and/or glowing of the tested sample persisted for a time beyond any of those specified in the UL tests criteria.

EXAMPLE 1

Samples of reflective ABS compositions were prepared by compounding by high-shear mixing a high gloss ABS resin with varying amounts, as shown in Table 1 below, of rutile titania which had been surface-modified to aid dispersion. The ABS polymer was a high-gloss material having a flammability according to the UL-94 standard of HB (Horizontal Burn) sold under the designation Magnum 9010 by Dow Chemical Company of Midland, Mich. The titania was sold under the trademark TiONA®9 RCL-4 by Millennium Inorganic Chemicals Co. of Hunt Valley, Md.

Plaques of the ABS compositions were molded from the compounded resin with a mold which had respective regions of glossy and matte finishes. Reflectance measurements were made on the glossy regions of the plaque (1.9 mm thick) with a Minolta reflectometer, Model CM-508d, and the results are shown in Table 1. These measurements combined both diffuse and specular contributions to reflectivity and are weighted by the relative response of the human eye. As high loadings of titania were approached, evidence was seen for a leveling off or saturation in reflectivity above a loading of about 25% by weight.

TABLE 1

| Sample # | 1-1 | 1-2 | 1-3 |
|---|---|---|---|
| Flammability | HB | HB | HB |
| Titania (wt %) | 6.70% | 18.00% | 30.50% |
| Total Reflectance* (%) | 92.28 | 95.26 | 96.33 |

*Average value of diffuse plus specular reflectance, from glossy region of the test plaques.

Figure 4:
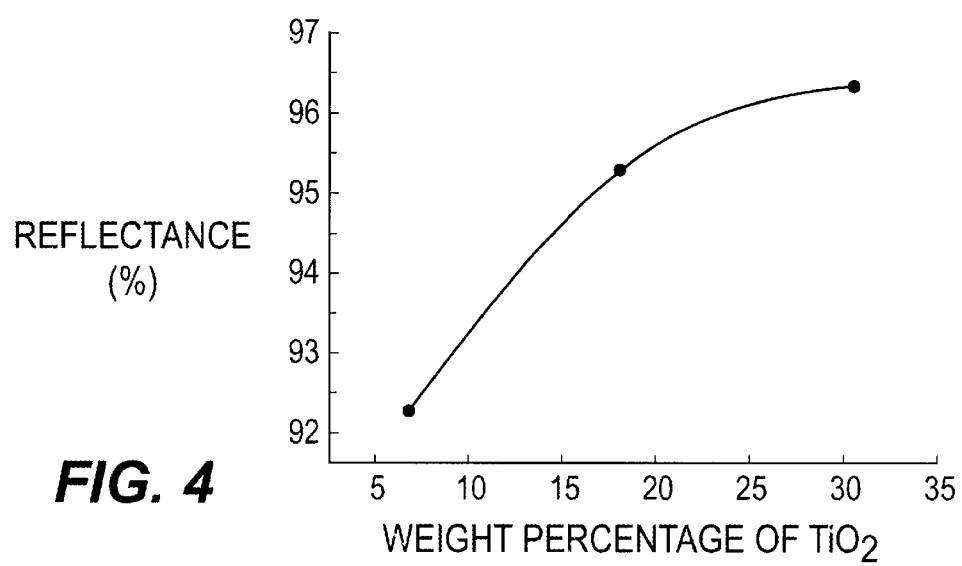
FIG. 4 is a plot of total reflectance of a flat sample of a material in accordance with an embodiment of the present invention as a function of the loading of titania filler therein.

The data of Table 1 are plotted in FIG. 4 wherein total reflectance is shown on the vertical axis and the weight percentage of titanium in the sample is shown on the horizontal axis. FIG. 4 shows graphically the increase in total reflectance with increasing weight of titania.

EXAMPLE 2

Three samples of flame-retardant reflective ABS compositions were prepared by compounding the high gloss ABS resin and surface-treated rutile titania as used in Example 1. Two of the samples were compounded with two flame-retardant additives, one of which (FR1) was a synergist comprising a fine powder form of antimony trioxide having a high tinting power. The other flame retardant (FR2) was a brominated organic compound comprising bis (tribromophenoxy)ethane which is sold as FF680 by Great Lakes Chemical Co. of Wilmington, Del. The flame-retardant compounded resins were then combined with the rutile titania. Plaques were molded from the compounded resin with a mold which had respective regions of glossy and matte finishes. Reflectance measurements were made on the glossy regions of the plaque, which had a thickness of 1.9 mm, with the Minolta reflectometer described in Example 1 and the results are shown in Table 2 below. These measurements combined both diffuse and specular contributions to reflectance. It was found that at a given fixed amount of titania (18 percent by weight) the presence of the flame retardants significantly degraded the total reflectance. Significantly more titania was required to be added (30.5 wt % vs. 18 wt %) in order to bring the reflectivity back to a value near 95%.

Reflectance test results and the UL 94 test regime results for the samples of Example 2 are as follows. Reflectance tests reported in this and the following examples were carried out as described in Example 1, unless otherwise specified.

TABLE 2

| Sample # | 2-1 | 2-2 | 2-3 |
|---|---|---|---|
| Flammability | HB | V-0 | V-0 |
| Titania (wt %) | 18.0% | 18.0% | 30.5% |
| FR1 ($Sb_2O_3$, wt %) | none | 4.9% | 4.2% |

TABLE 2-continued

| Sample # | 2-1 | 2-2 | 2-3 |
|---|---|---|---|
| FR2 (FF680, wt %) | none | 18.0% | 15.3% |
| Total Reflectance* | 95.26 | 93.96 | 94.62 |

*Average value of diffuse plus specular reflectance, from glossy region of the test plaques.

Table 2 shows that Sample 2-1 attained a 94 HB rating but not a 94 V-O rating, whereas Samples 2-2 and 2-3 attained a 94 V-O rating.

EXAMPLE 3

Figure 5:
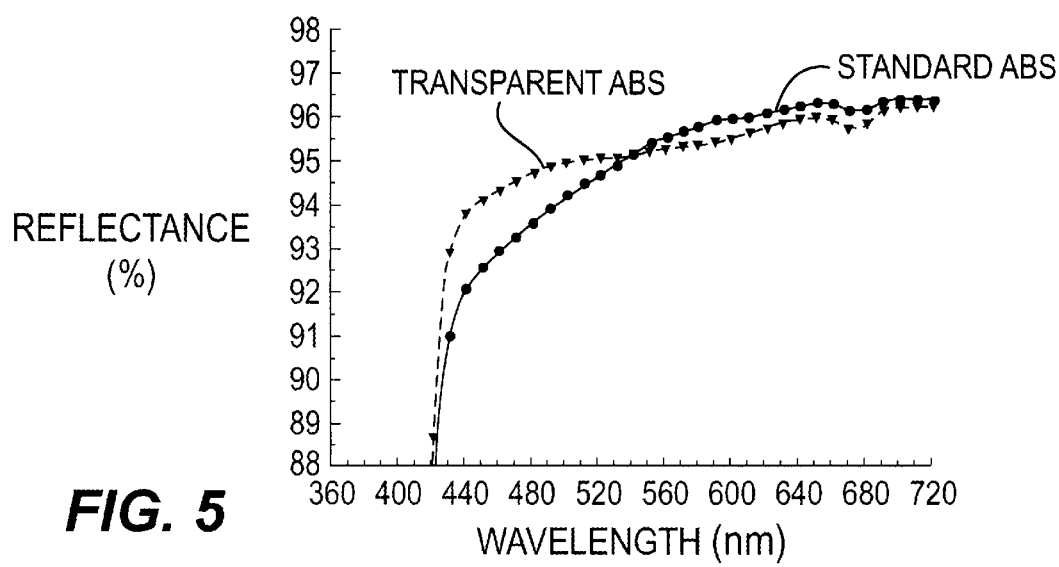
FIG. 5 is a plot of total reflectance of a flat sample against the wavelength of reflected light for two materials comprising different grades of polymer matrix in accordance with different embodiments of the present invention.

Samples of reflective compositions using different matrix resins were compounded. Sample 3-1 was compounded from ordinary high-gloss ABS resin (Dow Chemical's Magnum 9010) as used in Example 1, and Sample 3-2 was compounded from a special transparent grade of ABS (Terlux 2802TR) Sold by BASF Inc. of Ludwigshafen, Germany and Mount Olive, N.J. Both resins were compounded with a rutile $TiO_2$ which had been surface-modified to aid dispersion, TiONA RCL-4, obtained from Millennium Inorganic Chemicals Co., in the amounts shown in Table 3 below. Plaques were molded from the compounded resin with a mold which produced respective regions of glossy as well as matte finishes. Reflectance measurements were made on 1.9 mm thick glossy regions of the plaques with the MacBeth reflectometer identified in Example 4. The data from these tests are plotted in FIG. 5, wherein total reflectance (diffuse plus specular from glossy regions of the test plaques) are plotted on the vertical axis and the wavelength of reflected light on the horizontal axis. The average total reflectance values over the wavelength range are shown in Table 3 below, along with the results of flammability tests. Although the results for average reflectance over the visible light range were similar, as shown in Table 3, the spectral output was found to be much more constant with wavelength for the transparent ABS composition of Sample 3-2, as shown in FIG. 5. A more uniform spectral reflectance allows a light fixture employing such a reflector to source light at an effective color temperature which much more closely matches that of the lamp.

TABLE 3

| Sample # | 3-1 | 3-2 |
|---|---|---|
| Titania (wt %) | 18.0% | 25.0% |
| Total Reflectance* | 95.26 | 95.8 |

*Average value of diffuse plus specular reflectance from glossy regions of the test plaques.

EXAMPLE 4

The results of Example 2 showed that the flame-retardant additives for ABS have a significant deleterious effect on the reflectivity of the prepared compositions. Accordingly, a number of alternative flame-retardant additives were identified as possible alternatives on the basis of having high whiteness, good thermal stability, good UV stability, and in some instances good flow and impact-enhancing capabilities. A series of such compositions was prepared by high shear mixing of the ABS resin and surface-treated titania as described in Example 1 with selected brominated flame-retardant compounds as listed in Table 4A below, wherein the chemical names and suppliers of the flame retardants are as given in the following Table 4.

TABLE 4

| FR Designation | Chemical Name | Supplier |
|---|---|---|
| FF-680 | Bis(tribromophenoxy)ethane | Great Lakes Chemical Co. of Wilmington, DE |
| Saytex 8010 | Proprietary aromatic bromide | Albemarle Co. of Baton Rouge, LA |
| F-2016 | Brominated epoxy (1600 MW) | AmeriBrom Co. of New York, NY |
| FR-1808 | Octabromotrimethylphenylindane | AmeriBrom Co. |

Flame retardancy is very roughly proportional to the bromine content on a weight basis. Flow enhancement is predicted on the basis of whether the flame-retardant material can melt and dissolve or alloy with at least one phase of the matrix polymer during processing. Flow enhancement can be measured as an increase in melt index for a composition with a fixed amount of TiO2. F-2016, which is an amorphous material with a low temperature softening point (110° C.), blends readily with ABS. FF-680 and FR-1808 likewise blend with ABS once they are heated above their melting points. Of the entries in Table 4A, only Saytex 8010, which has a high melting point, will not form a melt blend with ABS under normal processing conditions. This flame retardant will exist as a particulate dispersion in the ABS composite. All of the alternate brominated organics have a greater thermal stability than does FF-680 as is evidenced by the temperature at which a 5% weight loss occurs during thermogravimetric analysis (TGA) of the compounded resin. The TGA is carried out by placing a sample of the flame retardant in an oven and heating the sample by increasing the oven temperature while observing the weight of the sample while being heated, and noting the temperature at which a weight loss of 5% of the starting weight of the sample is attained. These values as provided by the manufacturers are also given in Table 4A.

TABLE 4A

| FR Designation[1] | Bromine Content | Color | Flow Mod.** | MP ° C. | TGA, T @ 5 wt % loss | V-0 Formul.* |
|---|---|---|---|---|---|---|
| FF-680 | 70% | off-white | + | 225 | 290° C. | 22/6 |
| Saytex 8010 | 82% | white | – | 345 | 344° C. | No rating |

TABLE 4A-continued

| FR Designation[1] | Bromine Content | Color | Flow Mod.** | MP ° C. | TGA, T @ 5 wt % loss | V-0 Formul.* |
|---|---|---|---|---|---|---|
| F-2016 | 51% | white | + | — | 340° C. | 24/12 |
| FR-1808 | 73% | off-white | + | 247 | 325° C. | 16/8 |

*wt % FR/wt % Sb$_2$O$_3$ utilized to achieve a V-0 rating. For Saytex 8010 a formulation of 16/8 was insufficient to produce a V0 UL-94 rating (the sample burned).
**A decrease in flow of the molding composition caused by the added flame retardant is indicated by "−". Enhancement of this property by the added flame retardant is indicated by a "+".
[1]See Table 4.

Reflectance results for titania-containing molded materials produced with varying amounts of these flame retardants dispersed in an ABS polymer matrix sold under the trademark Magnum 9010 by Dow Chemical are listed below in Table 4B. Reflectance measurements were carried out as described below in this Example. For comparison purposes, the manufacturer's specifications for Magnum 9010 are included in Table 4B as Sample 4B-1.

TABLE 4B

Part 1

| Sample # | 4B-1 | 4B-2 | 4B-3 | 4B-4 |
|---|---|---|---|---|
| Flammability | HB | V-0 | <V-0 | <V-O |
| Reflectance* (Minolta) | — | 94.62% | 93.69 | 93.65 |
| Reflectance** (MacBeth) | — | 94.28% | 93.3 | 93.43 |
| Titania (wt %) | 0 | 30.50% | 22.30% | 22.60% |
| FR1/ATO*** (Microfine/AO5) | 0 | 6% | 8% | 8% |
| Total Inorganic | 0 | 35% | 29% | 29% |
| FR2 | 0 | FF680 | Saytex 8010 | Saytex 8010 |
| FR2 wt %*** | 0 | 22% | 16% | 16% |
| Brightener | 0 | no | no | yes (0.85%) |
| Elongation (%) | 40 | 2.4–4.5 | — | — |
| Notched IZOD Impact | 4 | 4.9–6.5 | — | — |
| Tensile Strength (PSI) | 5200 | 5197–5060 | — | — |

Part 2

| Sample # | 4B-5 | 4B-6 | 4B-7 | 4B-8 |
|---|---|---|---|---|
| Flammability | V-0 | V-0 | V-0 | V-0 |
| Reflectance* (Minolta) | 94.54 | 94.35 | 94.24 | 93.7 |
| Reflectance** (MacBeth) | 94.33 | 93.06 | 93.8 | 93.19 |
| Titania (wt %) | 22.30% | 22.60% | 22.60% | 27.20% |
| FR1/ATO*** (Microfine/AO5) | 12% | 12% | 8% | 8% |
| Total Inorganic | 32% | 32% | 29% | 33% |
| FR2 | F-2016 | F-2016 | FR-1808 | FR-1808 |
| FR2 wt %*** | 24% | 24% | 16% | 16% |
| Brightener | no | yes (0.085%) | no | yes (0.085%) |
| Elongation (%) | 1.56 | — | — | — |
| Notched IZOD Impact | 0.84 | — | — | — |
| Tensile Strength (PSI) | 5583 | — | — | — |

Figure 6:
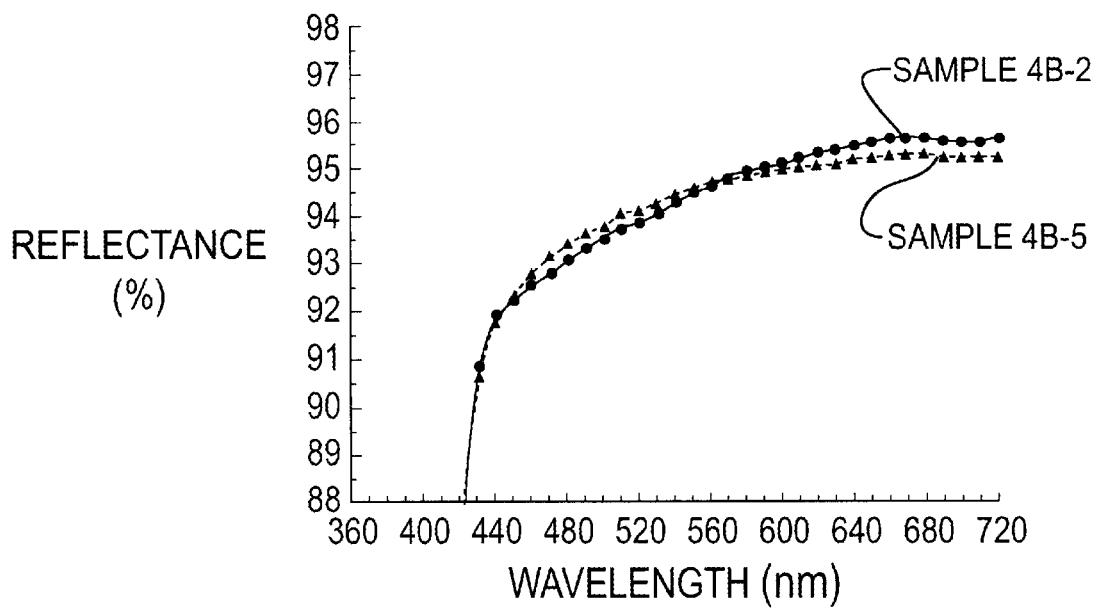
FIG. 6 is a plot of total reflectance of a flat sample against the wavelength of reflected light for two materials having different flame-retardants in accordance with different embodiments of the present invention.

— = not measured
*Diffuse + Specular, Average value from Minolta with D65 source, 2 degree angle
**Diffuse + Specular, Average value from MacBeth with D65 source
***ATO= antimony trioxide, percentages are based on FR2 and resin weight, not including weight of TiO$_2$
**Percentage based on weight of ATO and FR2, not including TiO$_2$ Reflectance measurements were made with both a MacBeth instrument (Model 7000) and a Minolta Model CM-508d. The MacBeth reflectometer provided reflectance as a function of wavelength as well as an average value of reflectance over the visible spectrum weighted for the response of the human eye. Both the Minolta and the MacBeth instruments are ostensibly designed to provide the same average reflectance. The differences in the data collected for a given sample in Table 4B result from slight differences in the two instruments and their calibration. Measurements were made on flat plaques having a glossy finish and an approximate thickness of 1.9 mm. FIG. 6 plots the total reflectance from the glossy test plaque of samples 4B-2 and 4B-5. The higher whiteness of the F-2016 flame retardant as compared to the FF680 flame retardant (see Table 4) and the higher loading of titania in sample 4B-5 as compared to sample 4B-2 resulted in sample 4B-5 giving a more uniform spectral response across the visible spectrum. This is illustrated in FIG. 6**.

The Saytex 8010 (Sample 4B-3 in Table 4B - Part 1) was not found to provide a V-0 flame retardant rating at the loading level employed. All of the other compositions achieved a V-0 flammability rating. The antimony trioxide amounts were raised in the new compositions over that used for sample 4B-2, since this allowed a reduction in the amount of the brominated organic compound needed to achieve the V-O rating. Since the organic compound is the primary source of thermal instability, UV instability and yellowness, the amount necessary was minimized to improve optical performance. Some enhancement in optical performance was seen for the sample 4B-5 in that the higher whiteness of flame retardant F-2016 (Table 4) along with the higher loading of antimony trioxide, gave the molded article of sample 4B-5 a more uniform spectral response across the visible spectrum than that of sample 4B-2. The mechanical properties of articles molded from the composition of 4B-5, however, were not as good as those for sample 4B-2 as is seen by a comparison of elongation-to-break and notched IZOD impact measurements listed in Table 4.

EXAMPLE 5

Figure 7:
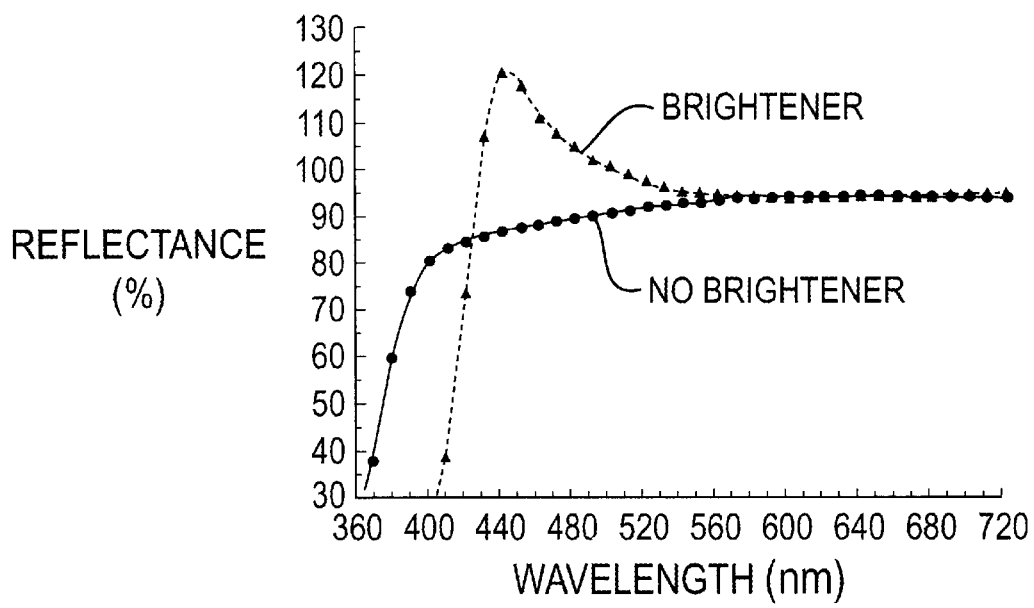
FIG. 7 is a plot of total reflectance of a flat sample versus the wavelength of reflected light for two materials, one with a brightener and one without, in accordance with different embodiments of the present invention.

The effect of the addition of a brightener was tested by comparing the results obtained with no brightener in an ABS sample (Magnum 9010) containing 6.7 wt % rutile titanium dioxide and one containing the same amount of rutile titanium dioxide with 0.17 wt % brightener. These samples contained no flame-retardant materials. The brightener (OB-1 from Eastman Chemical) served to absorb light emitted by the lamp in the ultraviolet and violet part of the spectrum and to re-emit this light at blue wavelengths. FIG. 7 plots total (diffuse plus specular) reflectance (as measured by the MacBeth instrument described in Example 4) on the vertical axis against the wavelength of reflected light on the horizontal axis. Reflectance was measured from the glossy regions of test plaques. FIG. 7 shows a peaked response for reflectivity in the blue wavelength range for the sample containing brightener, but this is achieved at the expense of providing light below about 425 nanometers ("nm"). This test served to demonstrate that the addition of brightener can help to augment response at blue wavelengths centered at about 450 nm, and effectively increase the color temperature of the reflected light averaged over the visible spectrum. This may be desirable in meeting the requirements of certain specific applications.

EXAMPLE 6

A sample of a reflective composition using an ABS/PC blend was made with a flame-retardant polymer blend, RTP 2500 FR A, available from RTP Co. of Winona, Minn. This blend contained polycarbonate (about 63% by weight), ABS (about 21% by weight), a brominated organic flame retardant (about 15% by weight), and a conventional stabilizer (about 1% by weight), but did not contain a synergist such as antimony trioxide. This resin was compounded with varying amounts of a rutile titania, TiPure® R-104, manufactured by DuPont. Flammability measurements were carried out on bar specimens according to UL-94 standards for vertical bum on each of the compositions.

Plaques were molded from these titania-filled resin compounds with a mold which produced a glossy finish. Reflectivity measurements were made with a Model 7000 Mac-Beth reflectometer on a section of the plaques with an approximate thickness of 1.9 millimeters. These measurements are tabulated in Table 5.

TABLE 5

| Sample # | 5-1 | 5-2 | 5-3 |
|---|---|---|---|
| Flammability | V-0 | V-2 | No rating (NR) |
| Titania (wt %) | 19.0% | 27.0% | 35.0% |
| Total Reflectance | 95.1% | 95.35% | 95.4% |

These results may be compared with those in Table 2 of Example 2 for an ABS resin containing no polycarbonate and employing a flame-retardant package comprising a quencher and a synergist. Samples 2-2 and 5-1 have the same flammability rating and have approximately the same titania content yet sample 5-1 has significantly higher reflectance (95.1 vs. 93.96%). The samples of Table 5 also provide a comparatively higher blue reflectivity and, as a consequence, a more uniform reflectivity across the visible spectrum.

EXAMPLE 7

The UV stability of various reflective compounds was investigated as a function of resin and type and content of $TiO_2$. The resins employed were acrylonitrile-butadiene-styrene ("ABS"), as in Example 1, ABS/PC, as in Example 6, and ABS/polyvinylchloride ("ABS/PVC"). Three types of rutile $TiO_2$ were also employed, TiPure R-104 and TiPure R-103 from DuPont and RCL-4 from Millennium Chemicals. All of these had similar fine particles size and similar blue tone. The R-103 had a heavier surface coat of alumina than the R-104 or RCL-4 titanias, resulting in the R-103 titania being designated by the manufacturer as a non-chalking grade. One of the samples, 7-1, contained a brightener (OB-1) as per Example 5.

Initial measurements of average reflectivity and yellowness according to the ASTM Standard Test Method for Indexes of Whiteness and Yellowness of Near-White, Opaque Materials, ASTM Designation E-313-73 (Reapproved 1993) were carried out on a glossy surface of molded samples with a MacBeth reflectometer. The aforesaid ASTM standard is incorporated by reference herein and is elsewhere herein and in the claims referred to as "the ASTM E-313 Test". The ASTM E-313 Test correlates visual ratings of yellowness or whiteness of certain white and near-white surfaces, including plastics. Test samples must be uniformly colored and flat throughout the area presented for measurement (paragraph 8.1 of the ASTM E-313 Test) and the test equipment must be a spectrophotometer equipped with a tristimulus integrator, a photoelectric reflectometer, or a colorimeter having source, filter and receptor characteristics such that it will measure the reflectance of white and near-white specimens accurately to within 1.0 percent of full-scale reading, and will give green-blue reflectance differences of such specimens accurately to plus or minus 0.5. Paragraph 6 of the E-313 Test provides specifics of the required test equipment.

As set forth in paragraph 7.1 of the ASTM E-313 Test, the primary test standard may be a tablet of magnesium or barium sulfate, of reflectance standard grade of white powder prepared as specified, or the ideal, perfectly reflecting, perfectly diffusing white standard. The instrument standard called for in paragraph 7.2 of the ASTM E-313 Test may comprise porcelain-enameled metal plaques, opaque white glass, or other such materials having reasonably permanent reflectance and surface uniformity.

As set forth in paragraph 10 of the ASTM E-3 13 Test, the yellowness index ("YI"), as well as the whiteness index, may be calculated from the test values obtained, as set forth below.

1) Calculate as required the mean value for the readings of each standard and specimen.
2) If a reflectometer is used, calculate the green, G, and blue, B, reflectances of each specimen in accordance with the directions of the instrument manufacturer. In the absence of more explicit instructions, specimen reflectance may be calculated as follows:

$$R = c \times (R_s/e)$$

where:
R=reflectance of the specimen for the filter used,
c=mean instrument reading for the specimen,
e=mean instrument reading for the standard used, and
$R_s$=assigned reflectance of the standard for the filter used.
3) The yellowness is then calculated as $$YI = 100(1 - B/G)$$

4) The whiteness index may be calculated as follows:

$$WI = 4B - 3G$$

Samples 7-1 through 7-10 were made with the above-described ABS, ABS/PC and ABS/PVC resins, and with the above-described titanias, the composition of the samples being as set forth in Table 7B below. Test plaques of a thickness of 1.9 mm were molded from the compounded resins with a mold which had respective regions of glossy and matte finishes.

The molded plaques of Samples 7-1 through 7-10 were then exposed to TV in a weatherometer as detailed in Table 7A. By use of suitable filters, a UV source roughly equivalent in spectral distribution to that of the sun was chosen. The plaques were maintained at an ambient temperature of 40° C., but surface temperatures may have reached temperatures as high as 60 ° C. Visible evidence of yellowing was obtained in all samples after the first (2-part) exposure interval, herein called Interval 1. The reflectance and yellowness changes that occurred are detailed in Table 7B. Calculated percentage changes in reflectivity and yellowness are presented in Table 7C. The measured reflectivity is total (specular plus diffuse) reflectivity as measured from glossy regions of the sample plaques by a MacBeth reflectometer as described in Example 4. The measured yellowness was as measured by the MacBeth instrument according to the above-described ASTM E-3 13 Test.

the composite. The highest rating obtained, with V-O and V-1 being considered to be higher than HB, is shown in Table 7B. Sample 7-3 combines a high reflectivity (>95%) with a V-0 classification and moderate tendency to yellow. Samples 7-7 and 7-8 showed the smallest change in reflectance, evidencing the fact that the use of R-103 titania offered increased UV stability as compared to samples using a chalking grade of titania such as R-104.

TABLE 7B

Data Summary

| Sample # | Resin | $TiO_2$ (wt %) | FR Rating | Initial Reflectance | Interval 1** Reflectance | Initial* Yellowness | Interval 1** Yellowness |
|---|---|---|---|---|---|---|---|
| 7-1 | ABS | RCL-4 (7%) | HB | 95.86 | 89.389 | −12.659 | 19.088 |
| 7-2 | ABS | RCL-4 (30.5%) | V-0 | 94.29 | 90.927 | 2.859 | 12.924 |
| 7-3 | ABS/PC(1) | R-104 (19%) | V-0 | 95.02 | 92.576 | 2.424 | 11.773 |
| 7-4 | ABS/PC(1) | R-104 (27%) | V-2 | 95.2 | 93.147 | 2.384 | 9.669 |
| 7-5 | ABS/PC(1) | R-104 (13%) | V-1 | 93.87 | 90.901 | 2.551 | 13.912 |
| 7-6 | ABS/PC(1) | R-104 (23%) | V-1 | 93.86 | 91.451 | 2.433 | 10.268 |
| 7-7 | ABS/PC(1) | R-103 (13%) | V-1 | 93.36 | 91.776 | 2.7 | 10.154 |
| 7-8 | ABS/PC(1) | R-103 (23%) | NR | 93.37 | 92.076 | 2.609 | 8.902 |
| 7-9 | ABS/PVC(2) | R-103 (27%) | — | 91.58 | 87.097 | 2.75 | 14.139 |
| 7-10 | ABS/PVC(2) | R-104 (27%) | — | 93.32 | 89.915 | 3.137 | 12.976 |

Notes:
*Negative yellowness indicates a bluish tinge
**Interval 1 = phase 1 + phase 2 as per Table 7A
(1)Composition is given in Example 6.
(2)A blend of PVC and ABS containing no additional flame retardant.

TABLE 7A

Weatherometry Conditions for Reflective Materials Interval 1

| Conditions | Phase One | Phase Two |
|---|---|---|
| Test Chamber | Atlas Ci3000/ Xenon Arc Lamp | Atlas Ci3000/ Xenon Arc Lamp |
| Duration | 72 hours | 168 hours |
| Lamp Filter Type (Inner/Outer) | Borosilicate/ Borosilicate glass | Borosilicate/ Borosilicate glass |
| Irradiance (W/m² @ 340 nm) | 0.55 | 1.05 |
| Black Panel (max. sample) Temp | 60° C. setpoint, 62° C. actual | 60° C. setpoint, 84° C. actual |
| Dry Bulb (sample) Temp | 40° C. (air heater off) | 40° C. (air heater off) |
| Relative Humidity | 30% | 30% |
| Cycle Information | Continuous exposure, no water spray | Continuous exposure, no water spray |
| Total Exposure (kJ) | 140 | 627 |

A number of observations were made regarding how sample composition affected UV stability. The first of these is that UV stability is a function of resin, and in the order of lowest to highest stability, the order was ABS/PVC, ABS, ABS/PC. With respect to the type of titania, the non-chalking grade of $TiO_2$ (R-103) gave a somewhat higher stability than the chalking grades (R-104 and RCL-4). The lowest degree of yellowness and the least percentage change in reflectivity were obtained with the R-103 $TiO_2$. By far the greatest influence on UV stability was the loading level of $TiO_2$. Higher levels of loading produced significantly more stable compounds as can be seen in Tables 7B and 7C, both with respect to the retention of high reflectivity and to a decreased level of yellowing. Fire retardancy rating (Table 7B), however, ran counter to the amount of $TiO_2$ present in While the invention has been described in connection with specific embodiments thereof, it will be appreciated that upon a reading and understanding of the foregoing, other embodiments of the invention will occur to those skilled in the art and it is intended to include all such embodiments within the scope of the appended claims.

What is claimed is:

1. A light-reflecting enclosure for a light source, said enclosure having at least one aperture formed therein and being dimensioned and configured to receive a light source within the enclosure and to transmit light through the aperture, said enclosure comprising a composite of a thermoplastic or thermoset polymer matrix having dispersed therein a flame-retardant material, and dispersed particles of a reflective filler;

the reflective the filler comprising a dielectric material having a particle size and reflective properties which enhance total reflectivity of the composite the filler further having an index of refraction which differs from the effective index of refraction of the other components of the composite;

the flame-retardant material comprising one or more compounds selected from the group consisting of decabromodiphenyloxide, octabromodiphenyloxide, tetrabromobisphenol A, brominated epoxy tetrabromo-bisphenol A-tetrabromobisphenol A diglycidylether, ethylenebistetrabromophthalamide, septabromotrimethylphenyl indane and octabromotrimethylphenol indane; and the filler and flame-retardant material being sufficiently-dispersed and present in the enclosure; wherein the enclosure has an average total reflectivity as measured from a flat sample of at least about 93 percent over the range of visible light; wherein the filler is selected from the group consisting of titania, zinc sulfide and strontium titanate, and wherein when the filler comprises titania, at least about 60 percent by weight of the titania particles have a diameter of from about 0.12 to 0.44 microns; when the filler comprises zinc sulfide, at least about 60 percent by weight of the zinc sulfide particles have a diameter of from about 0.17 to 0.65 microns, and when the filler comprises strontium titanate, at least about 60 percent by weight of the strontium titanate particles have a diameter of from about 0.16 to 0.62 microns.

2. The enclosure of claim 1 wherein the flame-retardant material further comprises particles of a metal oxide synergist, and wherein the flame-retardant material reduces flammability of the enclosure relative to an otherwise identical, enclosure lacking the flame-retardant material, the filler and the flame-retardant material being present in in the enclosure; wherein the enclosure has an average reflectivity of at least about 93 percent for light over a wavelength range of from about 400 to 700 nanometers, measured as total reflectivity from a flat sample.

3. The enclosure of claim 1 or claim 2 wherein the flame-retardant material is present in an amount which reduces the flammability of the enclosure to a UL-94 classification of at least V-1.

4. The enclosure of claim 2 wherein the synergist is selected from the group consisting of one or more of antimony trioxide, antimony pentoxide and a sodium antimonate, and the quencher comprises a brominated organic compound.

5. The enclosure of claim 4 wherein the synergist comprises antimony trioxide.

6. The enclosure of claim 2 wherein the synergist comprises antimony trioxide and the quencher comprises bis (tribromophenoxy)ethane.

7. The enclosure of claim 1 wherein the filler comprises rutile titania.

8. The enclosure of claim 7 wherein the polymer matrix comprises an acrylonitrile-butadiene-styrene terpolymer having an index of refraction of from about 1.48 to 1.60.

9. The enclosure of claim 7 wherein the polymer matrix comprises a blend of an acrylonitrile-butadiene-styrene terpolymer and a polycarbonate polymer.

10. The enclosure of claim 9 wherein the polymer matrix comprises from about 10 to 50 percent by weight of the acrylonitrile-butadiene-styrene terpolymer and from about 40 to 90 percent by weight of the polycarbonate polymer.

11. The enclosure of claim 1 further comprising a brightener selected from the group consisting of conjugated or partially conjugated organic compounds which are characterized by being fluorescent materials which absorb radiant energy in the ultra-violet region (about 300 to 400 nanometers wavelength) of the electromagnetic spectrum and emit such radiant energy as visible light in the blue region (about 400 to 470 nanometers wavelength) of the electromagnetic spectrum.

12. The enclosure of any one of claim 1 or claim 2 wherein the polymer matrix is selected from the group consisting of acrylonitrile-butadiene-styrene terpolymer, polyethylene terephthalate, polybutylene terephthalate, polyurethane, polyacrylonitrile, poly(methylpentene), polystyrene, polycarbonate, polymethacrylate, polyacrylate, poly(vinyl chloride), chlorinated polyethylene, and substituted derivatives, copolymers, blends and alloys of any of the foregoing.

13. The enclosure of claim 1 or claim 2 wherein the polymer matrix is selected from the group consisting of acrylonitrile-butadiene-styrene terpolymer, substituted derivatives and blends and alloys thereof, and the filler comprises titania.

14. The enclosure of claim 13 wherein the filler comprises rutile titania.

15. The enclosure of claim 14 wherein the polymer matrix is present in the amount of about 50 to 94 percent by weight of the enclosure and the rutile titania is present in the amount of from about 6 to 50 percent by weight of the article, provided that the amount of one or both of the polymer matrix and rutile titania is controlled to allow for the presence of the flame-retardant material in the amount which reduces flammability of the enclosure.

16. The enclosure of claim 1 wherein the filler consists essentially of rutile titania and is present in the amount of from about 6 to 50 percent by weight of the article.

17. The enclosure of claim 2 or claim 4 wherein the synergist comprises antimony trioxide and has a size range such that at least about 60 percent of the synergist particles have a diameter of from about 0.18 to 0.72 microns.

18. The enclosure of claim 2 or claim 4 wherein the synergist is present in the amount of from about 4 to 12 percent by weight of the enclosure, and the quencher is present in the amount of from about 10 to 25 percent by weight of the enclosure.

19. The enclosure of claim 18 wherein the synergist comprises antimony trioxide.

20. The enclosure of claim 2 or claim 4 comprising:
    from about 31 to about 70 weight percent acrylonitrile-butadiene-styrene, substituted derivatives and blends and alloys thereof as the matrix polymer;
    from about 15 to about 30 weight percent rutile titania as the filler;
    from about 3 to about 5 weight percent of antimony trioxide as the synergist; and
    as the quencher, from about 12 to 24 weight percent of a brominated organic compound selected from the group consisting of one or more of decabromodiphenyloxide, octabromodiphenyloxide, tetrabromobisphenol A, bis (tribromophenoxy)ethane, proprietary aromatic bromide, brominated epoxy, septabromotrimethylphenyl indane and octabromotrimethylphenyl indane;
    wherein the amount of one or both of the matrix polymer and the filler are controlled to allow for the presence of the flame-retardant material in the amount which reduces flammability of the enclosure.

21. The enclosure of any one of claim 1, 2 or 4 wherein the enclosure has a reflectivity of at least about 94 percent.

22. The enclosure of any one of claim 1, 2 or 4 wherein the enclosure has a reflectivity of at least about 95 percent.

23. A light-reflecting enclosure for a light source, said enclosure having at least one aperture formed therein and being dimensioned and configured to receive a light source within the enclosure to transmit light through the aperture, said enclosure comprising:
    a matrix comprising a thermoplastic or thermosetting polymer and an organic flame retardant together having an effective refractive index of $n_1$,
    the polymer matrix having dispersed therein particles of a reflective filler having a refractive index of $n_2$, the particles of filler having a size range wherein at least about 60% by weight of the particles have a diameter of from about D to 4D, wherein $D=\lambda_o/\pi n_1 \delta$ in which $\lambda_o$ is the mean free-space wavelength of the light range being reflected and $\delta=|n_2-n_1|$;
    the filler being present in enclosure; wherein the enclosure the has a reflectivity of at least about 93 percent for light in a wavelength range of from about 400 to 700 nanometers, measured as total reflectivity from a flat sample; and the flame retardant, comprising one or more compounds selected from the group consisting of decabromodiphenyloxide, octabromodiphenyloxide, tetrabromobisphenol A, brominated epoxy tetrabromobisphenol A-tetrabromobisphenol A diglycidylether, ethylenebistetrabromophthalamide, septabromotrimethylphenyl indane and octabromotrimethylphenol indane.

24. The enclosure of claim 23 wherein at least about 80 percent by weight of the particles have a particle diameter of from about D to 4D.

25. The enclosure of claim 23 wherein the particles of filler are dispersed in the matrix at an average distance from each other of at least about 3 $\lambda_o$.

26. The enclosure claim 23 wherein the polymer matrix is a flame-retardant thermoplastic or thermosetting compound having a flammability of a UL-94 classification of at least V-1.

27. The enclosure of claim 23 wherein the thermoplastic or thermosetting compound is non-yellow having a yellowness index of less than 10, measured according to the ASTM D 1925-70 Test.

28. The enclosure of claim 23 wherein δ is greater than about 0.5.

29. A light-reflecting article which comprises a composite of a thermoplastic or thermoset polymer matrix having dispersed therein a flame-retardant material, and dispersed particles of a reflective filler, the reflective filler comprising a dielectric material having a particle size and reflective properties which enhance total reflectivity of the composite, the filler further having an index of refraction which differs from the effective index of refraction of the other components of the composite;

the flame-retardant material comprising one or more compounds selected from the group consisting of decabromodiphenyloxide, octabromodiphenyloxide, tetrabromobisphenol A, brominated epoxy tetrabromobisphenol A-tetrabromobisphenol A diglycidylether, ethylenebistetrabromophthalamide, septabromotrimethylphenyl indane and octabromotrimethylphenol indane; and the filler and flame-retardant material being sufficiently dispersed and present in the article has an average total reflectivity as measured from a flat sample of at least about 93 percent over the range of visible light; wherein the filler is selected from the group consisting of titania, zinc sulfide and strontium titanate, and wherein when the filler comprises titania, at least about 60 percent by weight of the titania particles have a diameter of from about 0.12 to 0.44 microns; when the filler comprises zinc sulfide, at least about 60 percent by weight of the zinc sulfide particles have a diameter of from about 0.17 to 0.65 microns; and when the filler comprises strontium titanate, at least about 60 percent by weight of the strontium titanate particles have a diameter of from about 0.16 to 0.62 microns.

30. The article of claim 29 wherein the flame-retardant material further comprises a metal oxide synergist.

31. A light-reflecting enclosure for a light source, said enclosure having at least one aperture formed therein and being dimensioned and configured to receive a light source within the enclosure and to transmit light through the aperture, said enclosure comprising a composite of a thermoplastic or thermoset polymer matrix having dispersed therein a flame-retardant material, and dispersed particles of a reflective filler;

wherein the flame-retardant material comprises (i) particles of a metal oxide synergist comprising antimony trioxide having a size range such that at least about 60 percent of the synergist particles have a diameter of from about 0.18 to about 0.72 microns, and (ii) a halogenated organic compound quenches and wherein the flame-retardant material reduces flammability of the enclosure relative to an otherwise identical enclosure lacking the flame-retardant material;

the reflective filler comprising a dielectric material having a particle size and reflective properties which enhance total reflectivity of the composite, the filler further having an index of refraction which differs from the effective index of refraction of the other components of the composite;

the filler and flame-retardant material being dispersed and present in the enclosure; wherein the enclosure has an average total reflectivity as measured from a flat sample of at least about 93 percent over the range of visible light; wherein the filler is selected from the group consisting of titania, zinc sulfide and strontium titanate, and wherein when the filler comprises titania, at least about 60 percent by weight of the titania particles have a diameter of from about 0.12 to 0.44 microns; when the filler comprises zinc sulfide, at least about 60 percent by weight of the zinc sulfide particles have a diameter of from about 0.17 to 0.65 microns; and when the filler comprises strontium titanate, at least about 60 percent by weight of the strontium titanate particles have a diameter of from about 0.16 to 0.62 microns.

32. The enclosure of claim 31 wherein the flame-retardant material is present in the enclosure and reduces the flammability of the enclosure to a UL-94 classification of at least V-1.

33. The enclosure of claim 31, wherein the synergist is selected from the group consisting of one or more of antimony trioxide, antimony pentoxide and a sodium antimonite, and the quencher comprises a brominated organic compound.

34. The enclosure of claim 31 wherein the flame retardant comprises one or more of the group consisting of decabromodiphenyloxide, octabromodiphenyloxide, tetrabromobisphenol A, bis(tribromophenoxy)ethane, brominated epoxy tetrabromobisphenol A-tetrabromobisphenol A diglycidylether, ethylenebistetrabromophthalamide, septabromotrimethylphenyl indane and octabromotrimethylphenol indane.

35. The enclosure of claim 34 wherein the quencher comprises bis(tribromophenoxy)ethane.

36. The enclosure of claim 31 wherein the filler comprises rutile titania.

37. The enclosure of claim 31 wherein the polymer matrix comprises an acryltonitrile-butadiene-styrene terpolymer having an index of refraction of from about 1.48 to 1.60.

38. The enclosure of claim 31 wherein the polymer matrix comprises a blend of an acrylonitrile-butadiene-styrene terpolymer and a polycarbonate polymer.

39. The enclosure of claim 38 wherein the polymer matrix comprises from about 10 to 50 percent by weight of the acrylonitrile-butadiene-styrene terpolymer and from about 40 to 90 percent by weight of the polycarbonate polymer.

40. The enclosure of claim 31 further comprising a brightener selected from the group consisting of conjugated or partially conjugated organic compounds which are characterized by being fluorescent materials which absorb radiant energy in the ultra-violet region (about 300 to 400 nanometers wavelength) of the electromagnetic spectrum and emit such radiant energy as visible light in the blue region (about 400 to 470 nanometers wavelength) of the electromagnetic spectrum.

41. The enclosure of claim 31 wherein the polymer matrix is selected from the group consisting of acrylonitrile-butadiene-styrene terpolymer, polyethylene terephthalate, polybutylene terephthalate, polyurethane, polyacrylonitrile, poly(methylpentene), polystyrene, polycarbonate, polymethacrylate, polyacrylate, poly(vinyl chloride), chlorinated polyethylene, and substituted derivatives, copolymers, blends, and alloys of any of the foregoing.

42. The enclosure of claim 31 wherein the polymer matrix is selected from the group consisting of acrylonitrile-butadiene-styrene terpolymer, substituted derivatives and blends and alloys thereof, and the filler comprises titania.

43. The enclosure of claim 42 wherein the polymer matrix is present in the amount of about 50 to 94 percent by weight of the article and the rutile titania is present in the amount of from about 6 to 50 percent by weight of the article, provided that the amount of one or both of the polymer matrix and rutile titania is controlled to allow for the presence of the flame-retardant material in the amount which reduces flammability of the enclosure.

44. The enclosure of claim 31 wherein the filler consists essentially of rutile titania and is present in the amount of from about 6 to 50 percent by weight of the enclosure.

45. The enclosure of claim 31 wherein the synergist is present in the amount of from about 4 to 12 percent by weight of the article, and the quencher is present in the amount of from about 10 to 25 percent by weight of the enclosure.

46. The enclosure of claim 31 comprising:

from about 31 to about 70 weight percent acrylonitrile-butadiene-styrene, substituted derivatives and blends and alloys thereof as the matrix polymer, from about 15 to about 30 weight percent rutile titania as the filler;

from about 3 to about 5 weight percent of antimony trioxide synergist; and as the quencher, from about 12 to 24 weight percent of a brominated organic compound selected from the group consisting of one or more of decabromodiphenyloxide, octabromodiphenyloxide, tetrabromobisphenol A, bis(tribromophenoxy)ethane, brominated epoxy, septabromotrimethylphenyl indane and octabromotrimethylphenyl indane;

wherein the amount of one or both of the matrix polymer and the filler are controlled to allow for the presence of the flame-retardant material in the amount which reduces flammability of the enclosure.

47. The enclosure of claim 31 wherein the enclosure has a reflectivity of at least about 94 percent.

48. The enclosure of claim 31 wherein the enclosure has a reflectivity of at least about 95 percent.

* * * * *